(12) United States Patent
Lu et al.

(10) Patent No.: US 10,979,427 B2
(45) Date of Patent: Apr. 13, 2021

(54) METHOD AND DEVICE FOR AUTHENTICATING BASED ON AUTHENTICATING DEVICE

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FIE HAN TECHNOLOGIES CO., LTD., Beijing (CN)

( * ) Notice: Subject to any disclaimer, the term of this patent is extended or adjusted under 35 U.S.C. 154(b) by 355 days.

(21) Appl. No.: 15/856,049

(22) Filed: Dec. 27, 2017

(65) Prior Publication Data
US 2018/0124049 A1 May 3, 2018

Related U.S. Application Data

(63) Continuation of application No. PCT/CN2016/096223, filed on Aug. 22, 2016.

(30) Foreign Application Priority Data

Oct. 8, 2015 (CN) .......................... 201510645439.4

(51) Int. Cl.
*H04L 29/06* (2006.01)
*H04L 29/08* (2006.01)
(Continued)

(52) U.S. Cl.
CPC ........ *H04L 63/0876* (2013.01); *H04L 9/3234* (2013.01); *H04L 63/06* (2013.01);
(Continued)

(58) Field of Classification Search
None
See application file for complete search history.

(56) References Cited

U.S. PATENT DOCUMENTS 9,288,208 B1 * 3/2016 Roth .................... H04L 63/0884
9,338,007 B1 * 5/2016 Doshi ..................... H04L 9/321
(Continued)

FOREIGN PATENT DOCUMENTS

CN 103634265 A 3/2014
CN 103685311 A 3/2014
(Continued)

OTHER PUBLICATIONS

No stated author; "FIDO U2F Raw Message Formats, FIDO Alliance Proposed Standard Oct. 9, 2014"; 2014; Fido Alliance; retrieved from https://fidoalliance.org/specifications/download/; pp. 1-10, as printed. (Year: 2014).*
(Continued)

*Primary Examiner* — Michael W Chao
(74) *Attorney, Agent, or Firm* — J.C. Patents

(57) ABSTRACT

An authenticating method based on an authenticating device includes: a client obtains an application ID according to an URI; requests a server for an authentication using the application ID and a user identification; receives current authenticating data from the server; obtains client data object using a challenge value in the current authenticating data; hashes the client data object and the application ID in the current authenticating data; obtains a key identification in the current authenticating data; sends current authentication request information including the client parameter, the key identification and key identification length to the authenticating device; receives authentication response information from the authenticating device; requests the server for a signature verification using the authentication response information, the client data object and a session ID in the current authenticating data; and the authentication is successful if information returned from the server indicates verification pass, or is failed if otherwise.

9 Claims, 19 Drawing Sheets

(51) Int. Cl.
*H04L 9/32* (2006.01)
*H04W 12/72* (2021.01)

(52) U.S. Cl.
CPC ...... *H04L 63/0853* (2013.01); *H04L 63/0884* (2013.01); *H04L 67/146* (2013.01); *H04L 63/126* (2013.01); *H04L 67/42* (2013.01); *H04W 12/72* (2021.01)

(56) References Cited

U.S. PATENT DOCUMENTS

| | | | | |
|---|---|---|---|---|
| 9,654,466 | B1* | 5/2017 | Wu | H04L 63/0428 |
| 9,935,953 | B1* | 4/2018 | Costigan | H04L 63/0876 |
| 10,075,437 | B1* | 9/2018 | Costigan | H04L 9/0841 |
| 10,623,398 | B2* | 4/2020 | Nguyen | H04L 63/0442 |
| 2004/0098585 | A1* | 5/2004 | Grove | G06F 21/31 713/168 |
| 2008/0109365 | A1* | 5/2008 | Kulkarni | G06F 21/31 705/55 |
| 2008/0172341 | A1* | 7/2008 | Crandell | G06F 21/34 705/75 |
| 2011/0067095 | A1* | 3/2011 | Leicher | H04L 63/06 726/10 |
| 2012/0079570 | A1* | 3/2012 | Fu | H04L 9/3213 726/5 |
| 2014/0082715 | A1* | 3/2014 | Grajek | H04W 12/068 726/8 |
| 2014/0189828 | A1* | 7/2014 | Baghdasaryan | H04L 63/0861 726/6 |
| 2015/0180869 | A1* | 6/2015 | Verma | H04L 63/0838 726/4 |
| 2016/0087957 | A1* | 3/2016 | Shah | H04L 63/205 726/1 |
| 2016/0127447 | A1* | 5/2016 | Jiang | G06F 3/0486 709/203 |
| 2016/0294562 | A1* | 10/2016 | Oberheide | H04L 9/0863 |
| 2017/0099151 | A1* | 4/2017 | Kim | H04L 9/3263 |
| 2018/0034804 | A1* | 2/2018 | Steiner | G06F 21/34 |
| 2018/0365399 | A1* | 12/2018 | Deutschmann | G06F 21/316 |

FOREIGN PATENT DOCUMENTS

| | | |
|---|---|---|
| CN | 104104687 A | 10/2014 |
| CN | 104394001 A | 3/2015 |
| CN | 104639559 A | 5/2015 |
| CN | 104639562 A | 5/2015 |
| CN | 105187450 A | 12/2015 |
| EP | 2 345 975 A1 | 7/2011 |
| WO | WO 2014/154110 | 10/2014 |

OTHER PUBLICATIONS

No stated author; "Universal 2nd Factor (U2F) Overview, FIDO Alliance Proposed Standard Oct. 9, 2014"; 2014; Fido Alliance; retrieved from https://fidoalliance.org/specifications/download/; pp. 1-16, as printed. (Year: 2014).*

No stated author; "FIDO UAF Protocol Specification v1.0, FIDO Alliance Proposed Standard Dec. 8, 2014"; 2014; Fido Alliance; retrieved from https://fidoalliance.org/specifications/download/; pp. 1-39, as printed. (Year: 2014).*

No stated author; "FIDO AppID and Facet Specification v1.0, FIDO Alliance Proposed Standard Dec. 8, 2014"; 2014; Fido Alliance; retrieved from https://fidoalliance.org/specifications/download/; pp. 1-6, as printed. (Year: 2014).*

No stated author; "FIDO UAF Authenticator Commands v1.0, FIDO Alliance Proposed Standard Dec. 8, 2014"; 2014; Fido Alliance; retrieved from https://fidoalliance.org/specifications/download/; pp. 1-28 as printed. (Year: 2014).*

Balfanz; FIDO @2F Application Isolation through Facet Identification; 2014; retrieved from the Internet https://fidoalliance.org/specs/fido-u2f-v1.0-rd-20140209/; pp. 1-14, as printed. (Year: 2014).*

International Search Report of corresponding International PCT Application No. PCT/CN2016/096223, dated Nov. 11, 2016.

* cited by examiner

METHOD AND DEVICE FOR AUTHENTICATING BASED ON AUTHENTICATING DEVICE

CROSS-REFERENCE TO RELATED APPLICATIONS

This application is a continuation of International Application No. PCT/CN2016/096223, filed on Aug. 22, 2016, which claims priority to Chinese Patent Application No. 201510645439.4, filed on Oct. 8, 2015. The disclosures of the aforementioned applications are hereby incorporated by reference in their entireties.

TECHNICAL FIELD

The present disclosure relates to the field of information security, and more particularly, to a method and a device for authenticating based on an authenticating device.

BACKGROUND

Great risk of online identity authentication technology based on password exists in the prior art. Password of a user can be obtained by guessing and technology such as stealing credit certificate online, network phishing, etc. If the length of a password used by a user is relatively short, or the password is a weak password which can be cracked easily, the user will be vulnerable to attacks, leading to personal information breach and even property damage. In traditional identity authentication methods, a client needs to send a password to a password library of a remote server for verification, which has the risk of being intercepted and cracked. In addition, the passwords are stored in the same remote server, hence a compromised super administrator account may leak out passwords of all users stored in the remote server.

SUMMARY

Embodiments of the present disclosure provide a method and a device for authenticating based on an authenticating device to overcome defects in the prior art. Identity authentication is rapidly expanding online by involving the authenticating device in the identity authentication, enhancing security for the Internet.

According to one aspect of embodiments of the present disclosure, a method for authenticating based on an authenticating device is provided, which includes:

Step S1: a client obtains a uniform resource identifier, obtains an application ID according to the uniform resource identifier, obtains a device authenticating request according to the application ID and a user identification input by a user, and sends the device authenticating request to a server;

Step S2: the client receives current authenticating data sent by the server;

Step S3: the client obtains a client data object according to a challenge value in the current authenticating data, applies hash operation to the client data object and the application ID in the current authenticating data to obtain a client parameter, obtains a key identification in the current authenticating data, combines the client parameter, the key identification and key identification length into current authenticating request information, and sends the current authenticating request information to the authenticating device;

Step S4: the client receives information returned by the authenticating device, determines the type for the received information and, if the type is authentication fail information, determines that the authenticating is failed and the method terminates, or if the type is authentication response information, executes Step S5;

Step S5: the client combines the authentication response information, the client data object and a session ID in the current authenticating data into a signature verifying request, and sends the signature verifying request to the server; and Step S6: the client receives information returned by the server, determines whether the received information is success information and, if yes, determines that the authenticating is successful, otherwise, determines that the authenticating is failed.

According to another aspect of embodiments of the present disclosure, a client for authenticating based on an authenticating device is provided, which includes: a first generating module, a first sending module, a first receiving module, a second generating module, a third generating module, a first determining module, a fourth generating module and a second determining module, where the first generating module is configured to obtain an application ID according to the uniform resource identifier, and obtain a device authenticating request according to the application ID and a user identification input by a user;

the first sending module is configured to send the device authenticating request generated by the first generating module to a server, send current authenticating request information generated by the third generating module to the authenticating device, and send a signature verifying request generated by the fourth generating module to the server;

the first receiving module is configured to receive current authenticating data returned by the server, receive information returned by the authenticating device, and receive information returned by the server;

the second generating module is configured to obtain a client data object according to a challenge value in the current authenticating data received by the first receiving module;

the third generating module is configured to apply hash operation to the client data object generated by the second generating module and the application ID in the current authenticating data received by the first receiving module to obtain a client parameter, obtain the key identification in the current authenticating data, and combine the client parameter, the key identification and key identification length into the current authenticating request information;

the first determining module is configured to determine the type for information returned by the authenticating device and received by the first receiving module and, if the type is authentication fail information, determine that the authenticating is failed and terminate the authenticating;

the fourth generating module is configured to, when the first determining module determines that the information returned by the authenticating device is authentication response information, combine the authentication response information, the client data object generated by the second generating module, and the session ID in the current authenticating data received by the first receiving module into the signature verifying request; and the second determining module is configured to determine whether the information returned by the server and received by the first receiving module is success information and, if yes, determine that the authenticating is successful, otherwise, determine that the authenticating is failed.

According to another aspect of embodiments of the present disclosure, a server of authenticating based on the authenticating device is provided, which includes: a second receiving module, a first parsing module, a seventh determining module, a second obtaining module, a fifth generating module, a third obtaining module, an eighth determining module, a sixth generating module, a verifying module, a first updating module and a second sending module, where the second receiving module is configured to receive a device authenticating request sent by a client, and receive a signature verifying request sent by the client;

the first parsing module is configured to parse the device authenticating request received by the second receiving module to obtains an application ID and a user identification, parse the signature verifying request received by the second receiving module to obtain authentication response information, a client data object and a session ID in the current authenticating data;

the seventh determining module is configured to search for a key record in the server according to the user identification obtained through parsing by the first parsing module, and determine whether any key record matching the user identification can be found;

the second obtaining module is configured to, when the seventh determining module determines that a key record matching the user identification can be found, obtain the key record as current key record;

the fifth generating module is configure to obtain the key identification from the current key record obtained by the second obtaining module, generate a session ID and a challenge value which correspond to the key identification, and combine the challenge value, the session ID, the application ID and the key identification obtained through parsing by the first parsing module into the current authenticating data;

the third obtaining module is configured to obtain the current authentication count of the authenticating device and a signature result from the authentication response information obtained through parsing by the first parsing module;

the eighth determining module is configured to determine whether the current authentication count of the authenticating device obtained by the third obtaining module is more than the current authentication count in the server and, if not, return error information to the client;

the sixth generating module is configured to determine, when the eighth determining module determines that the current authentication count of the authenticating device is more than the current authentication count in the server, search for an application ID corresponding to the session ID obtained through parsing by the first parsing module, apply hash operation to the client data object obtained through parsing by the first parsing module and the application ID found in the searching to obtain a server parameter, and combine the server parameter and the current authentication count of the authenticating device obtained by the third obtaining module into authenticating data;

the verifying module is configured to search for a public key in the key record corresponding to the session ID obtained through parsing by the first parsing module, perform signature verification according to the authenticating data generated by the sixth generating module, the signature result obtained by the third obtaining module and the public key in the key record found in the searching, and determine whether the signature verification is successful;

the first updating module is configured to, when the verifying module determines that the signature verification is successful, update the current authentication count in the server; and the second sending module is configure to return error information to the client when the seventh determining module determines that a key record matching the user identification cannot be found; send the current authenticating data generated by the fifth generating module to the client; return error information to the client when the eighth determining module determines that the current authentication count of the authenticating device is not more than the current authentication count in the server; return success information to the client when the verifying module determines that the signature verification is successful; or return error information to the client when the verifying module determines that the signature verification is failed.

According to another aspect of embodiments of the present disclosure, an authenticating device of authenticating based on the authenticating device is provided, which includes: a third receiving module, a fourth obtaining module, a fourteenth determining module, a seventh generating module, a signing module, a second updating module, an eighth generating module and a third sending module, where the third receiving module is configured to wait for receiving a current authenticating request information sent by the client, and wait for receiving confirming information from the user;

the fourth obtaining module is configured to obtain the key identification in the current authenticating request information received by the third receiving module;

the fourteenth determining module is configured to search the authenticating device for a private key in a key pair corresponding to the key identification obtained by the fourth obtaining module, and determine whether any private key in a key pair corresponding to the key identification can be found;

the seventh generating module is configured to, when the fourteenth determining module determines that a private key in a key pair corresponding to the key identification can be found, obtain data to be signed according to the current authentication count of the authenticating device and the client parameter in the current authenticating request information received by the third receiving module;

the signing module is configured to, when the third receiving module receives the confirming information from the user, use the found private key corresponding to the key identification to sign the data to be signed, which is generated by the seventh generating module, according to a signature algorithm to obtain a signature result;

the second updating module is configured to, when the signing module performs the signing, update the current authentication count for the authenticating device;

the eighth generating module is configured to combine the current authentication count of the authenticating device obtained through updating by the second updating module and the signature result obtained through signing by the signing module into authentication response information; and the third sending module is configured to return authentication fail information to the client when the fourteenth determining module determines that a private key in a key pair corresponding to the key identification cannot be found, and send the authentication response information generated by the eighth generating module to the client.

Embodiments of the present disclosure provide a method and a device for authenticating based on an authenticating device, in which the authenticating device participates in a process of identity authentication and stores a private key of a user therein, making it harder for cyber offenders to obtain this information. During the identity authentication, the private key will not be sent out, and after the identity has been authenticated successfully, the client will not keep any login information. Thus, fast identity authentication is realized, and security for Internet is improved.

BRIEF DESCRIPTION OF THE DRAWINGS

The technical solutions of the embodiments of the disclosure are described clearly and completely in conjunction with the accompanying drawings as follows. Apparently, the described drawings are merely a part of but not all of the embodiments according to the disclosure. Based on the described drawings of the disclosure, other drawings can be obtained by those of ordinary skill in the art without any creative work.

DETAILED DESCRIPTION

The technical solutions of the embodiments of the disclosure are described clearly and completely in conjunction with the accompanying drawings as follows. Apparently, the described drawings are merely a part of but not all of the embodiments according to the disclosure. Based on the described embodiment of the disclosure, other embodiments obtained by those of ordinary skill in the art without any creative work belong to the scope of the disclosure.

Embodiments of the present disclosure provide a method and a device for authenticating based on an authenticating device, which are applied in a system including a client, a server, and an authenticating device.

Embodiment 1

Figure 1A:
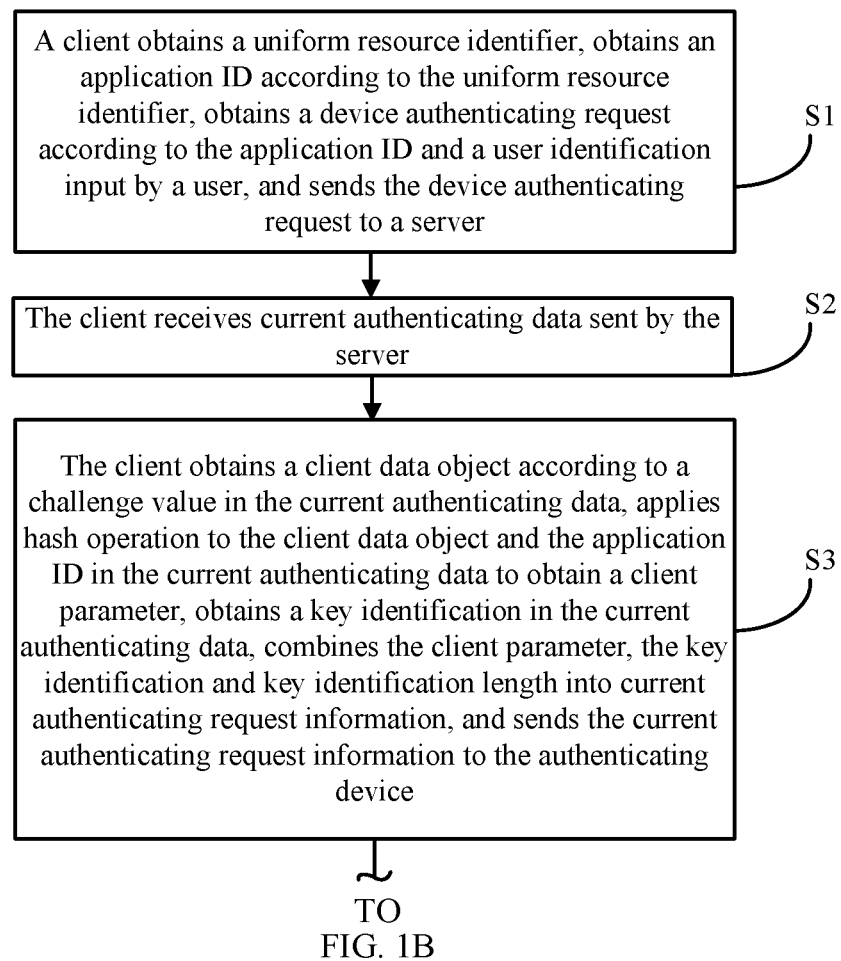
FIGS. 1A-1B are flowcharts illustrating a method for authenticating based on an authenticating device and provided by Embodiment 1 of the present disclosure.
Figure 1B:
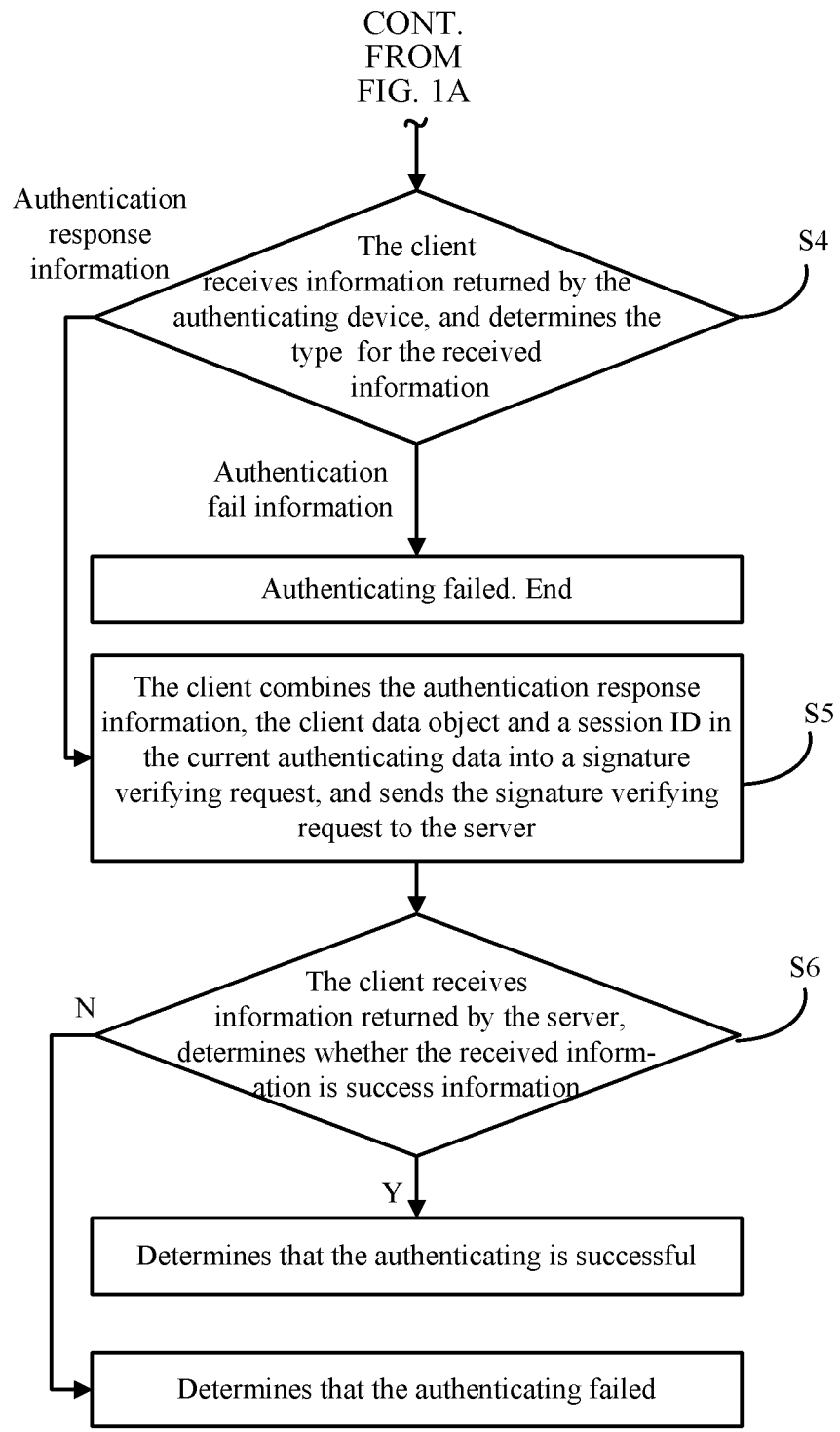
Figure 2A:
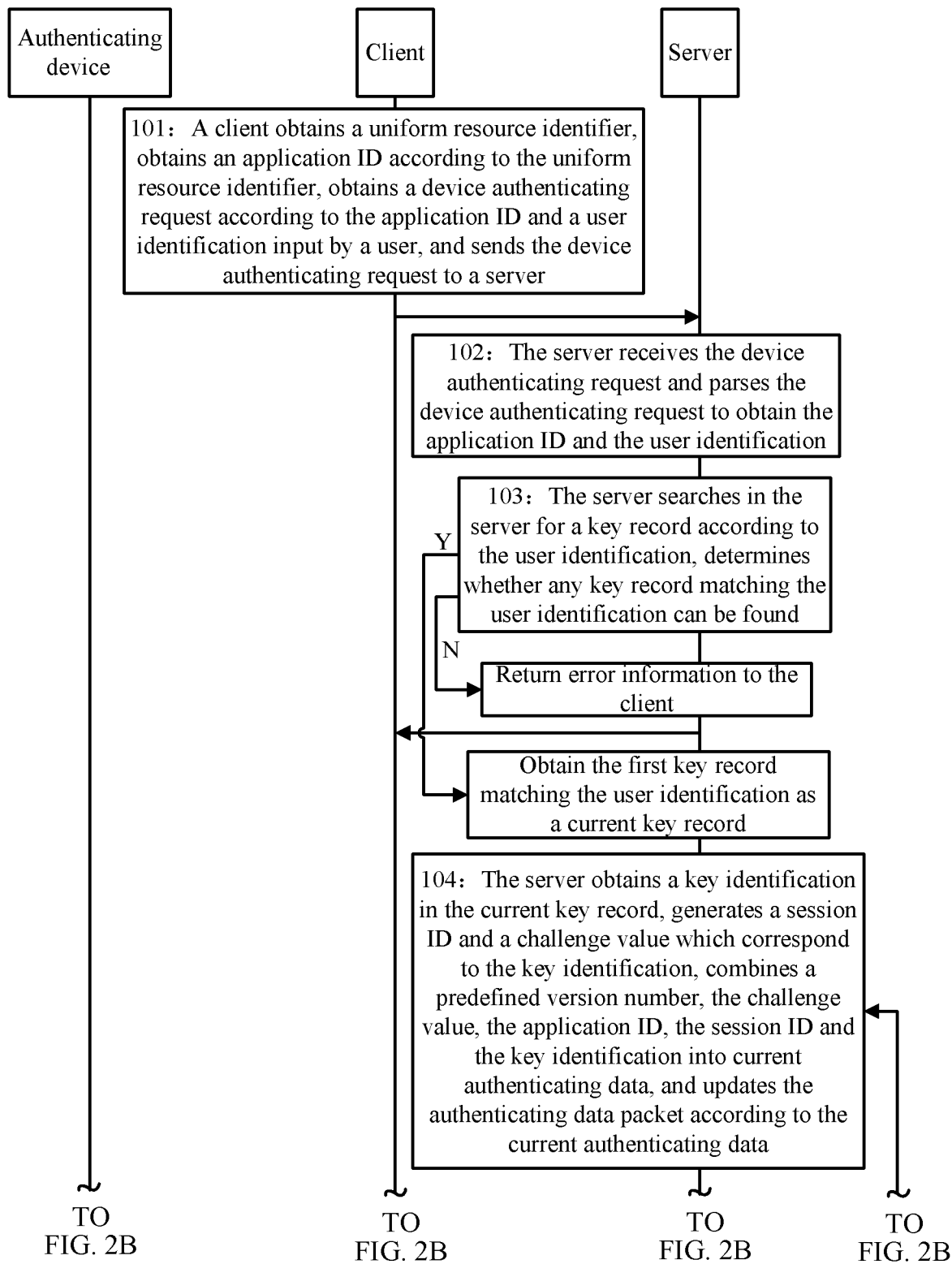
FIGS. 2A-2C are flowcharts illustrating a method for authenticating based on an authenticating device and provided by Embodiment 2 of the present disclosure.
Figure 2B:
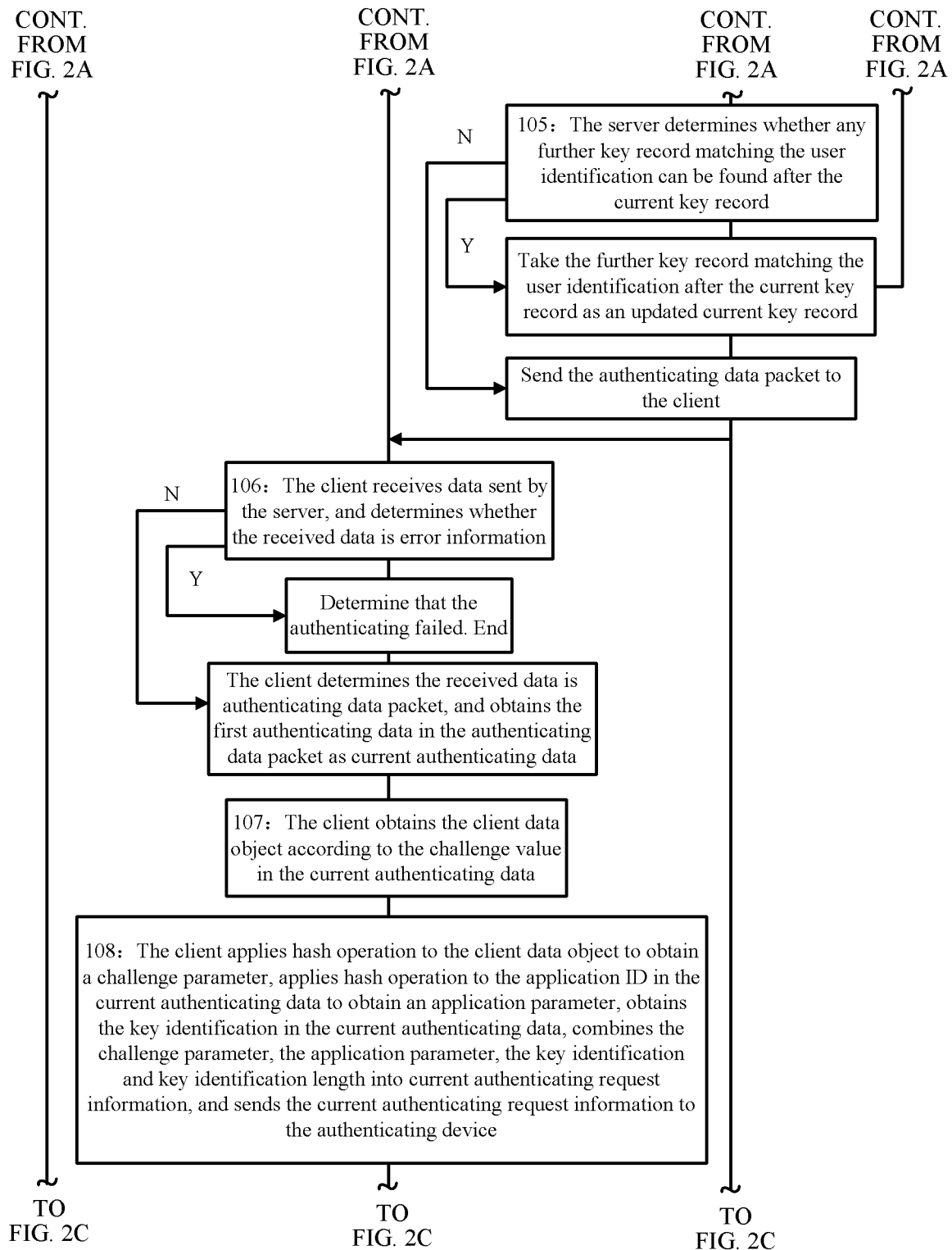
Figure 2C:
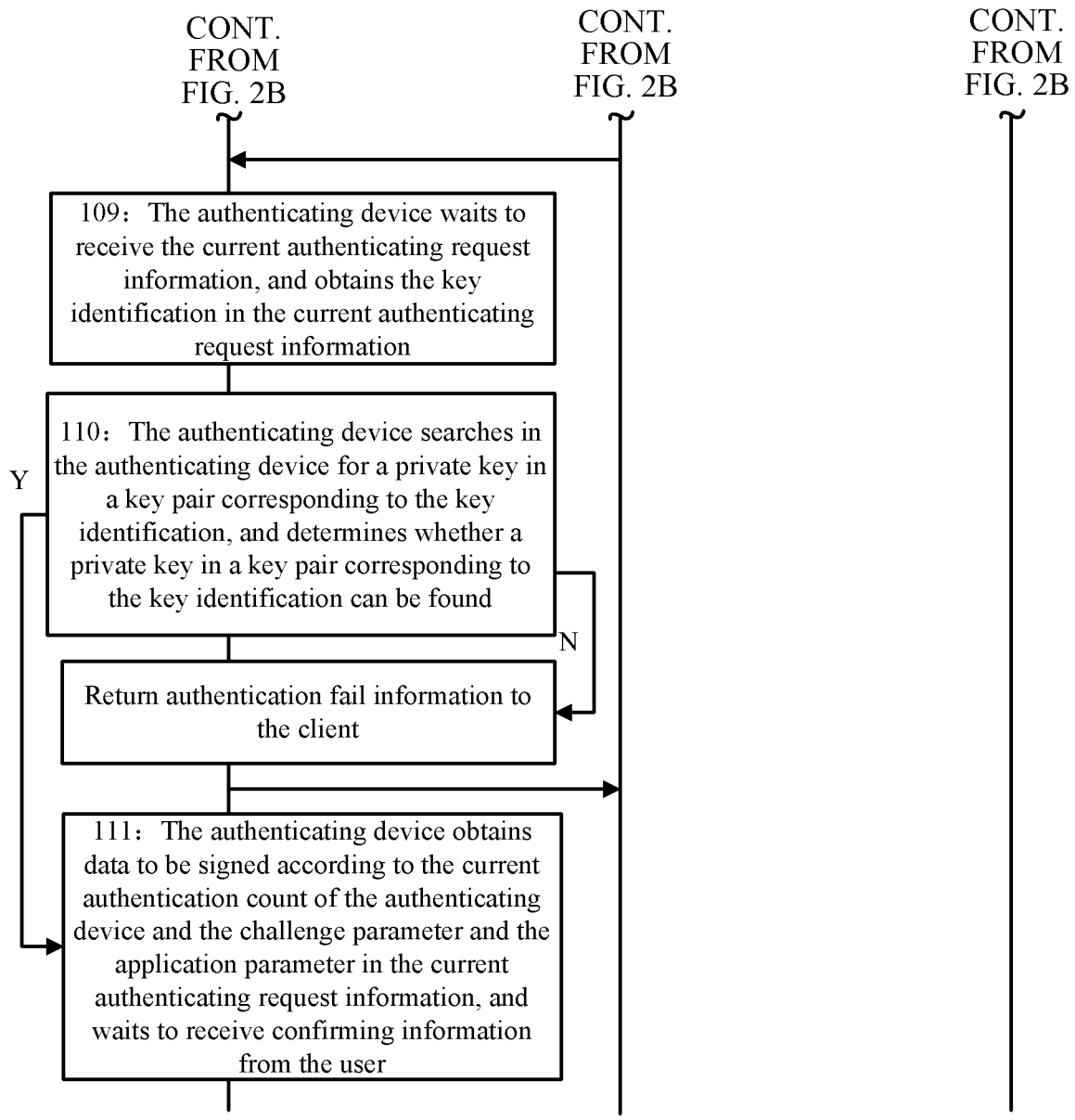
Figure 3A:
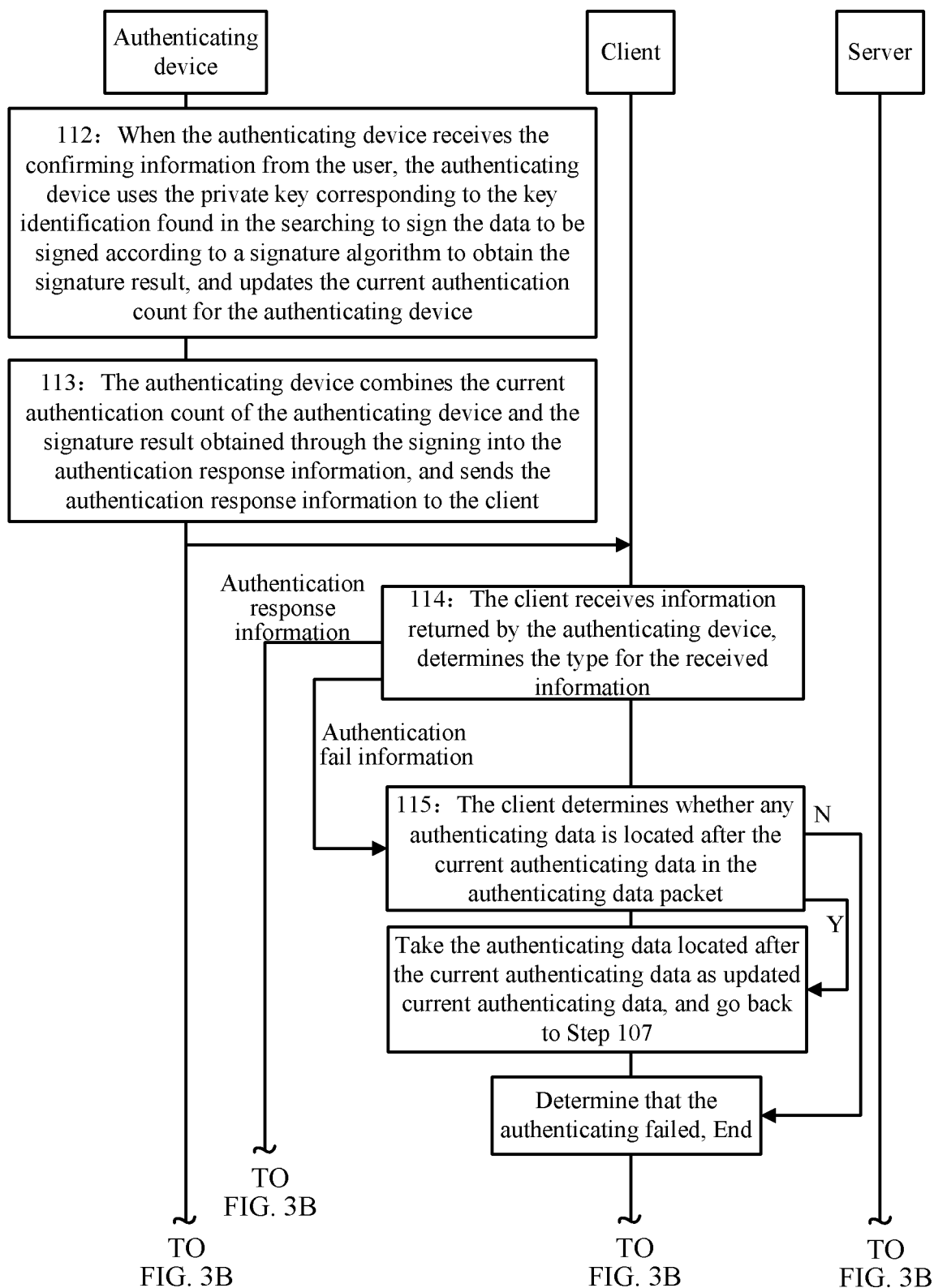
FIGS. 3A-3C are flowcharts illustrating a method for authenticating based on an authenticating device and provided by Embodiment 2 of the present disclosure.
Figure 3B:
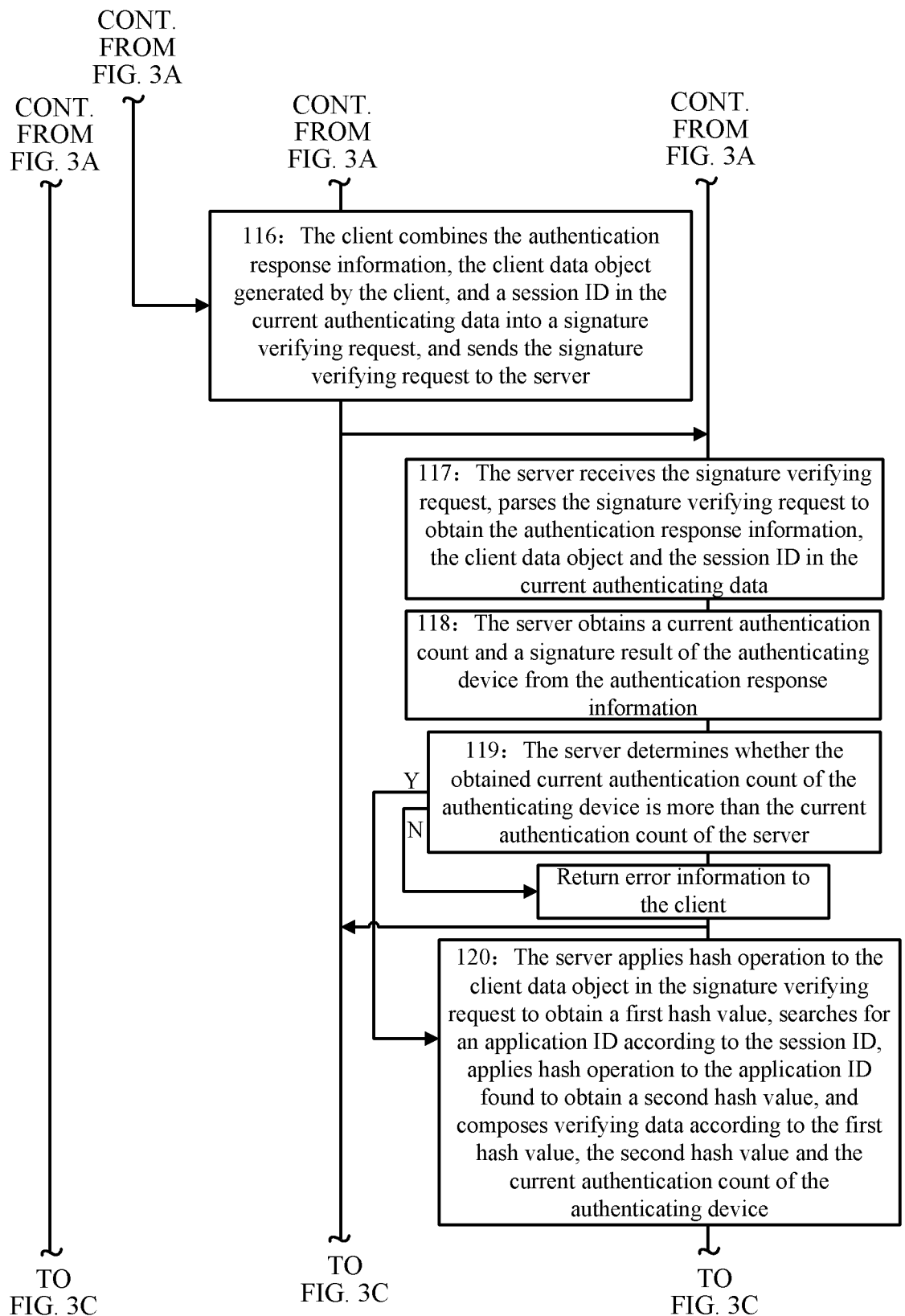
Figure 3C:
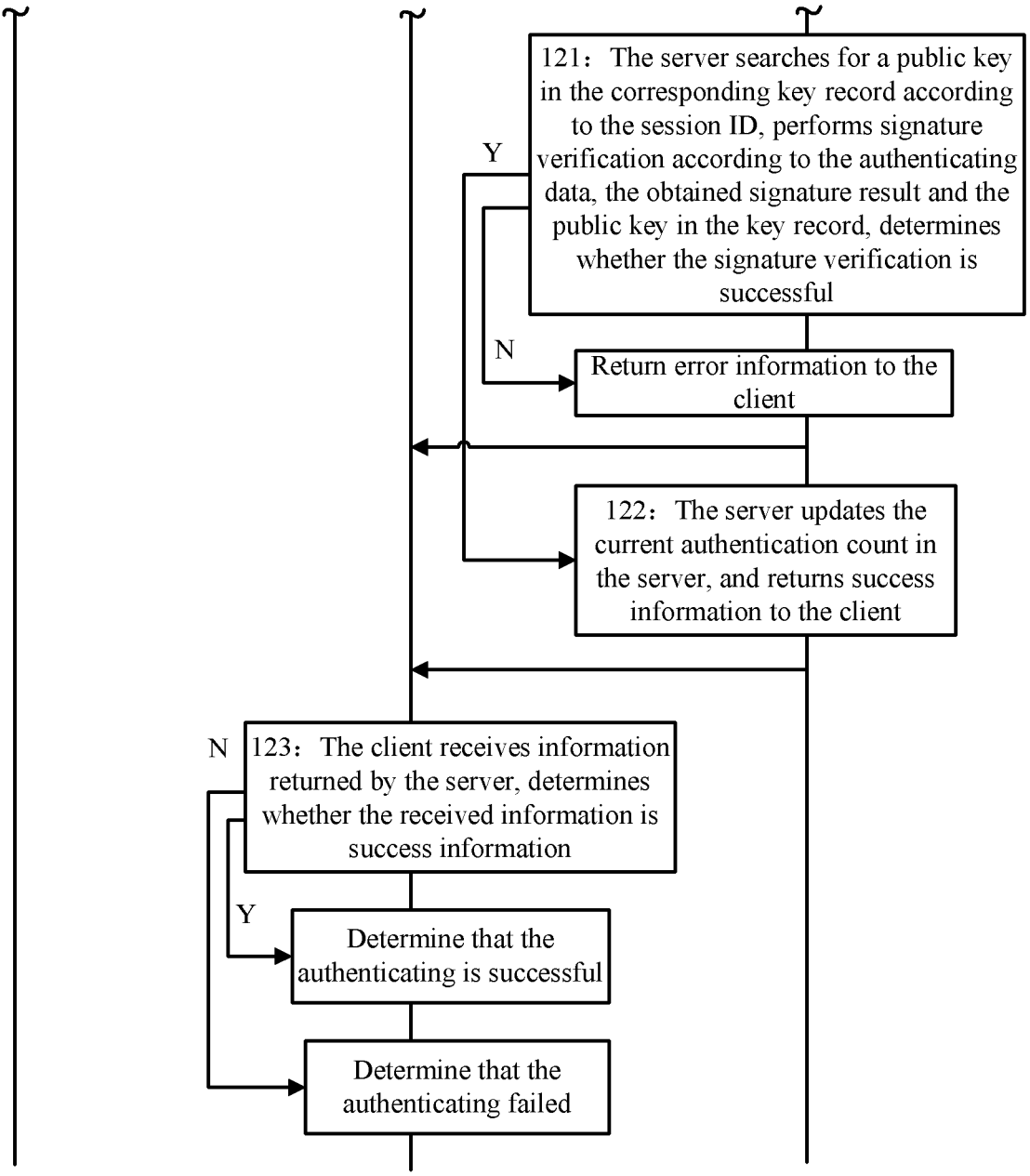
Figure 4A:
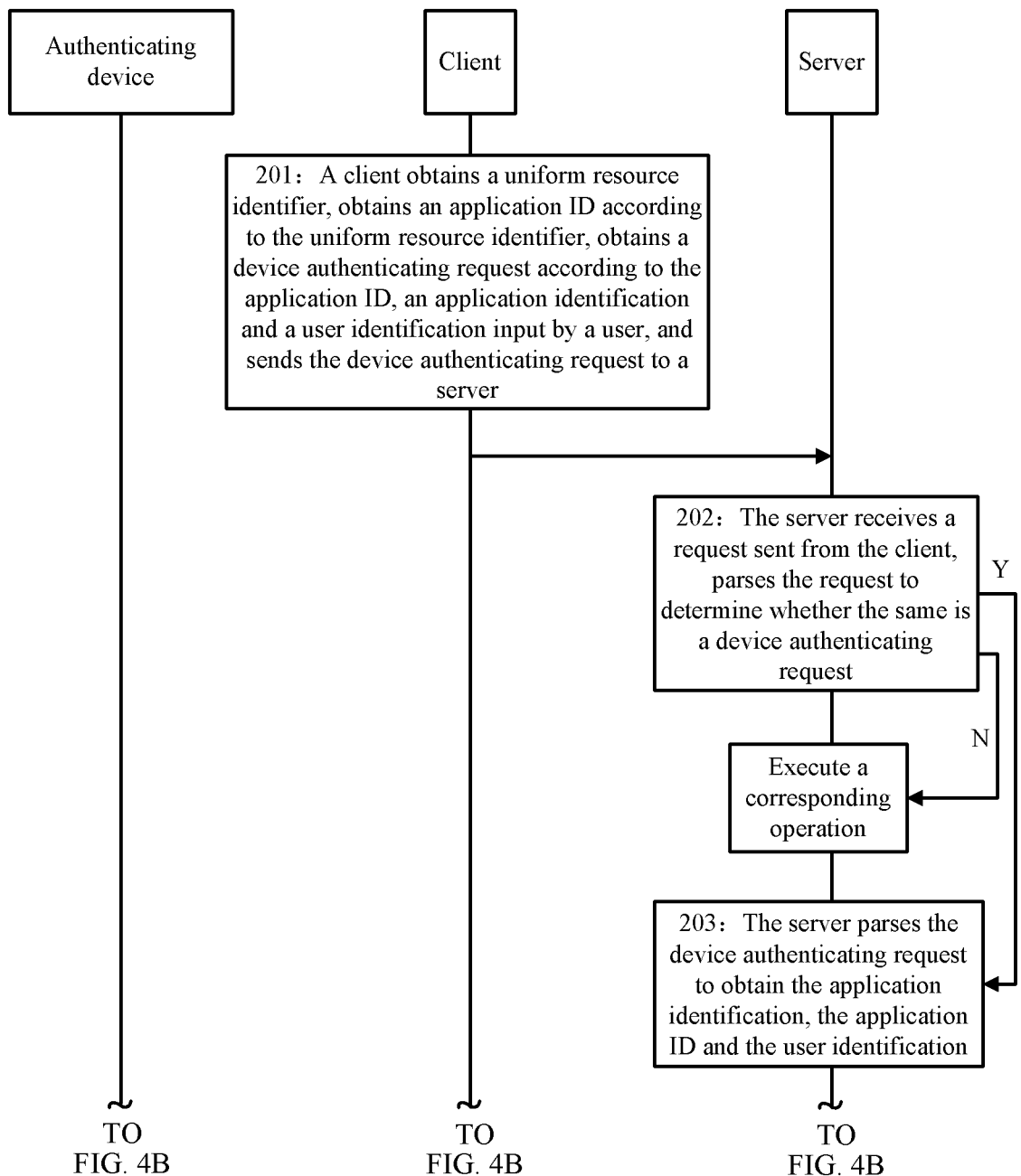
FIGS. 4A-4C are flowcharts illustrating a method for authenticating based on an authenticating device and provided by Embodiment 3 of the present disclosure.
Figure 4B:
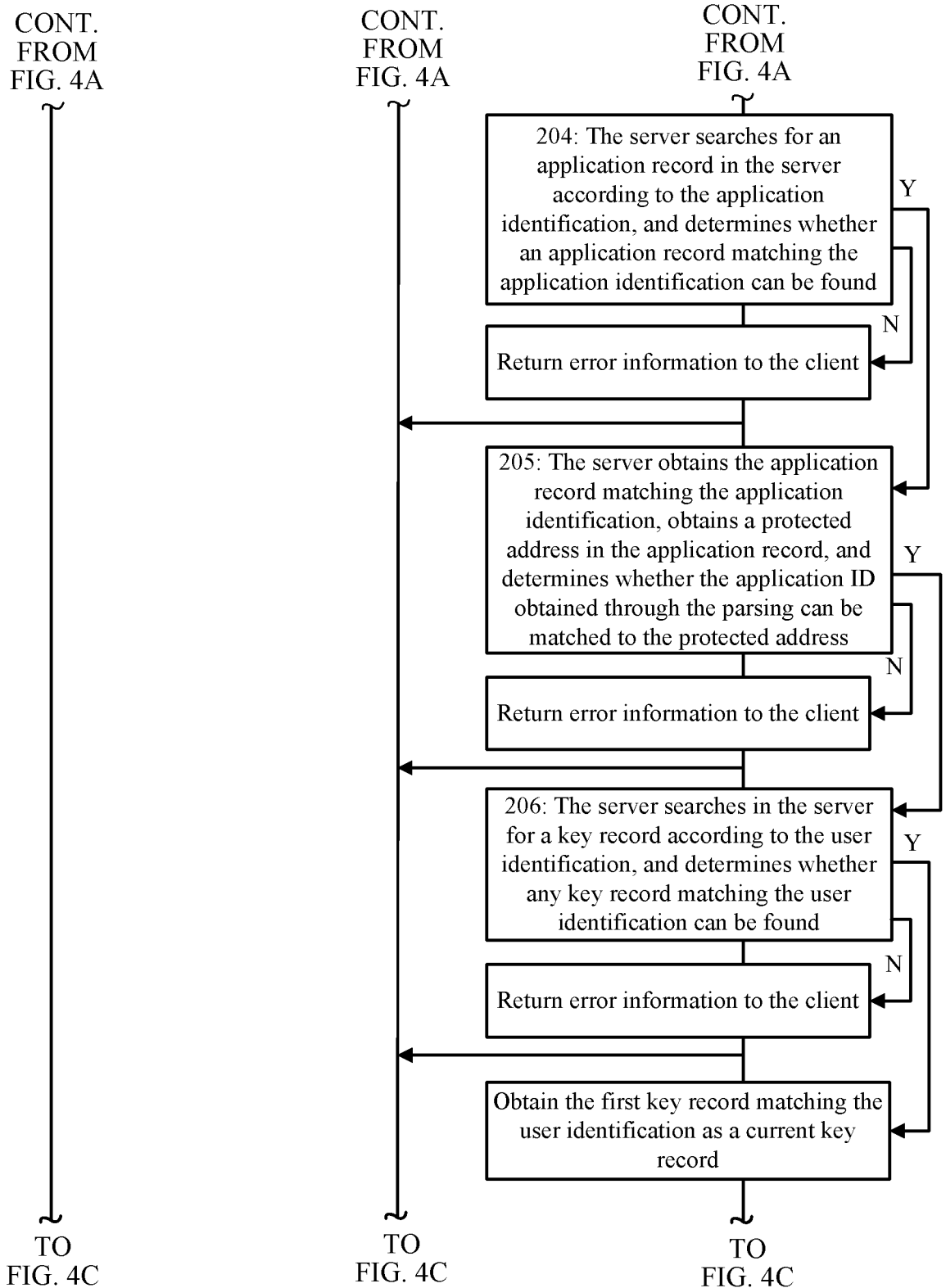
Figure 4C:
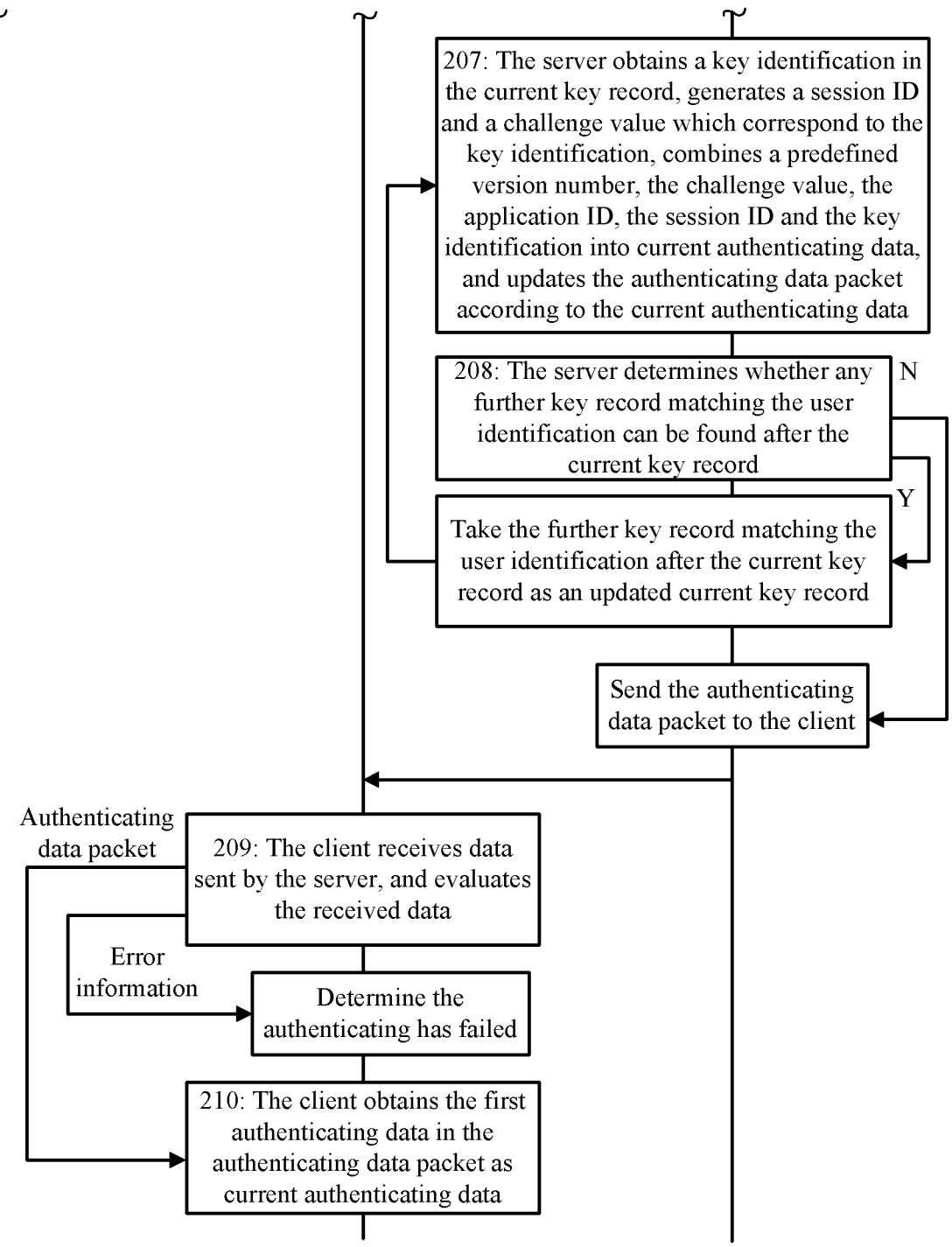
Figure 5A:
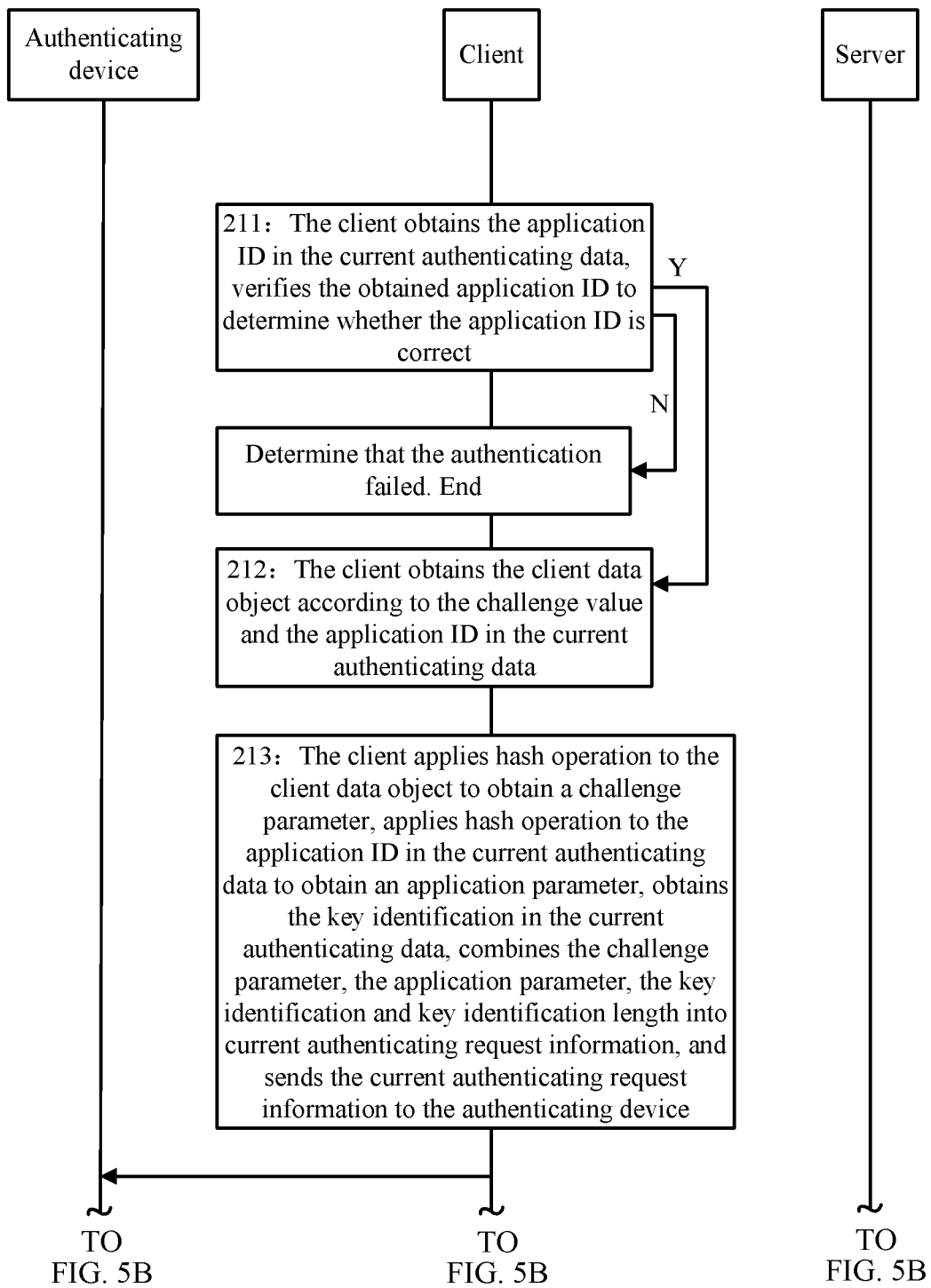
FIGS. 5A-5C are flowcharts illustrating a method for authenticating based on an authenticating device and provided by Embodiment 3 of the present disclosure.
Figure 5B:
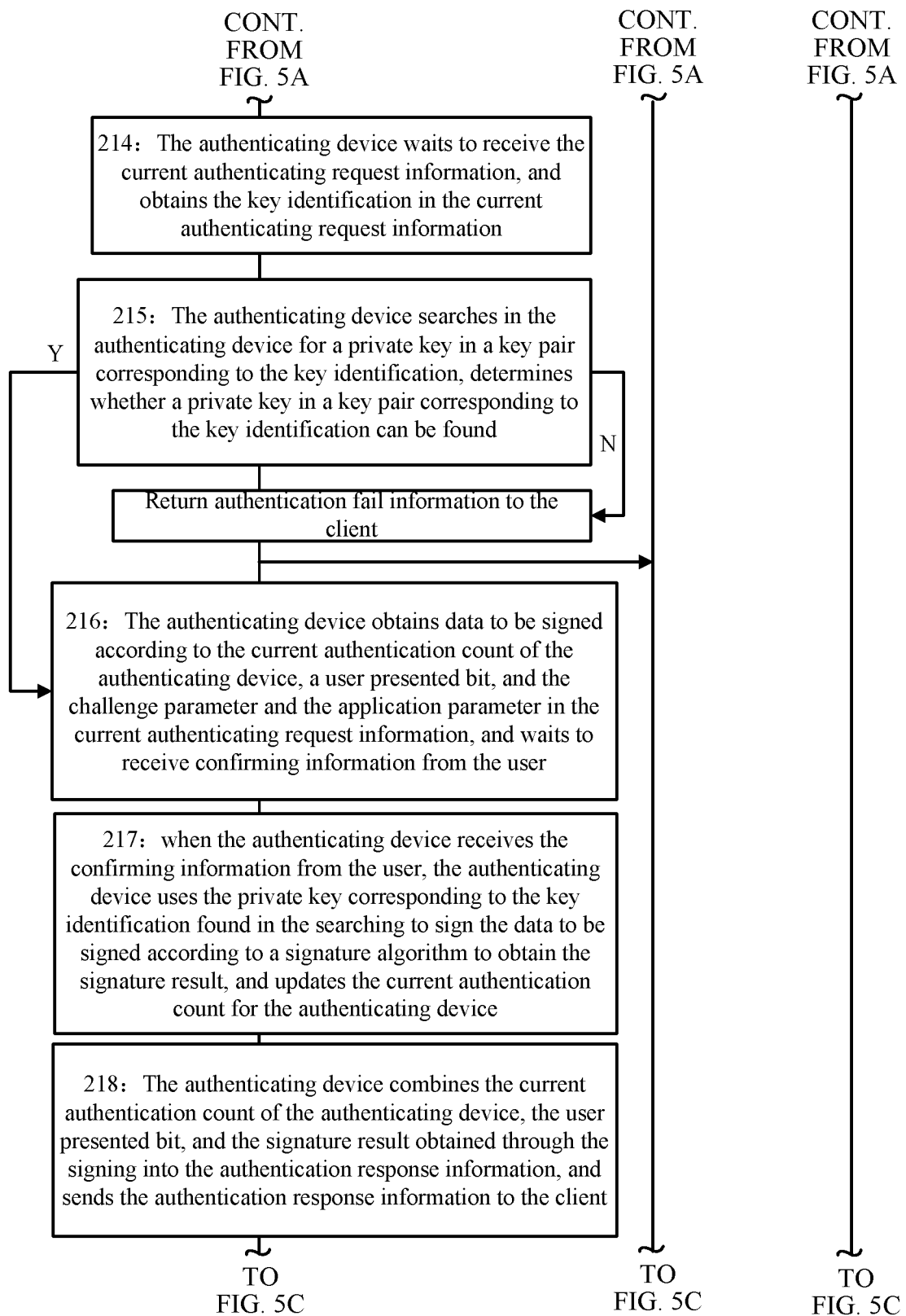
Figure 5C:
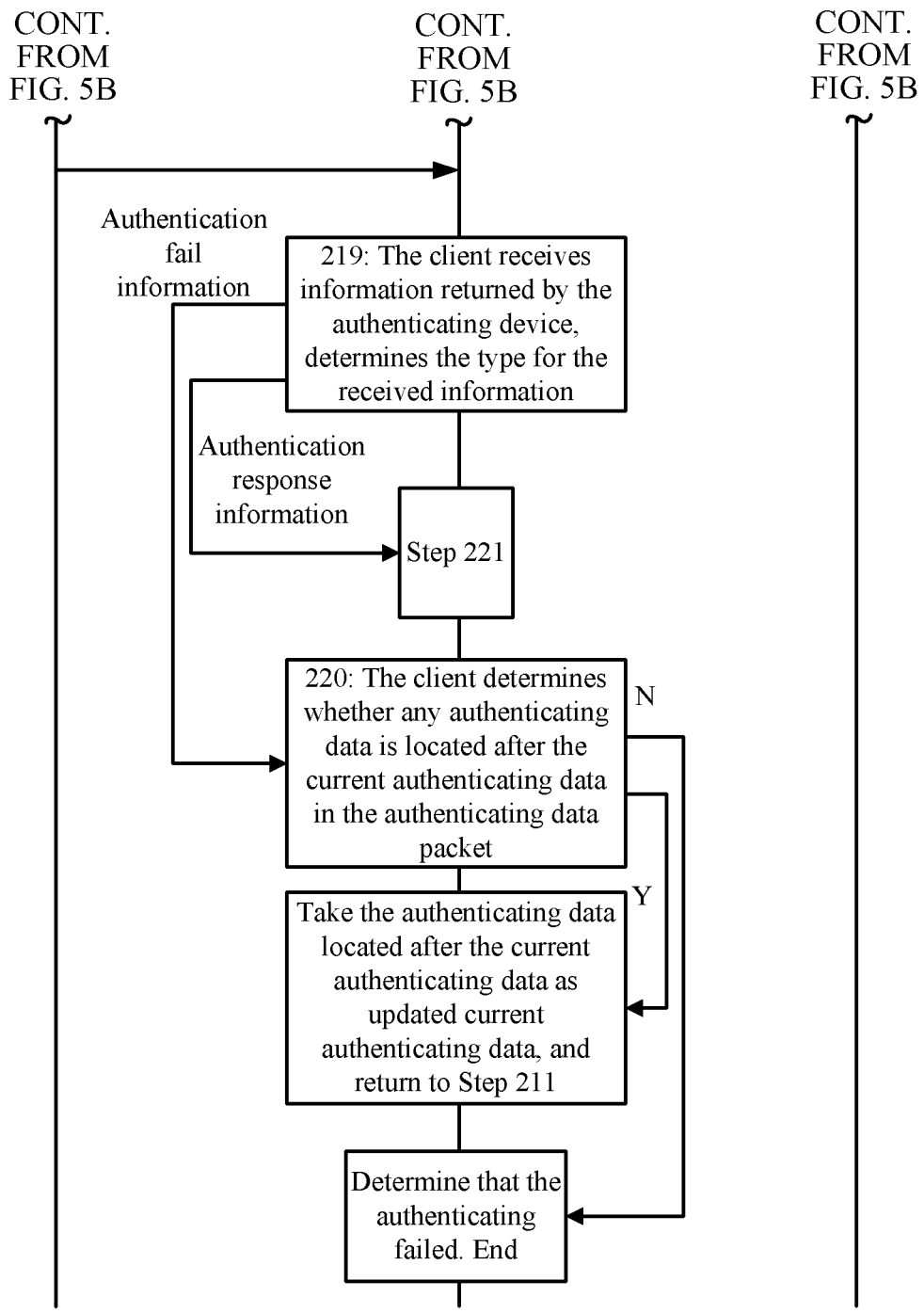
Figure 6A:
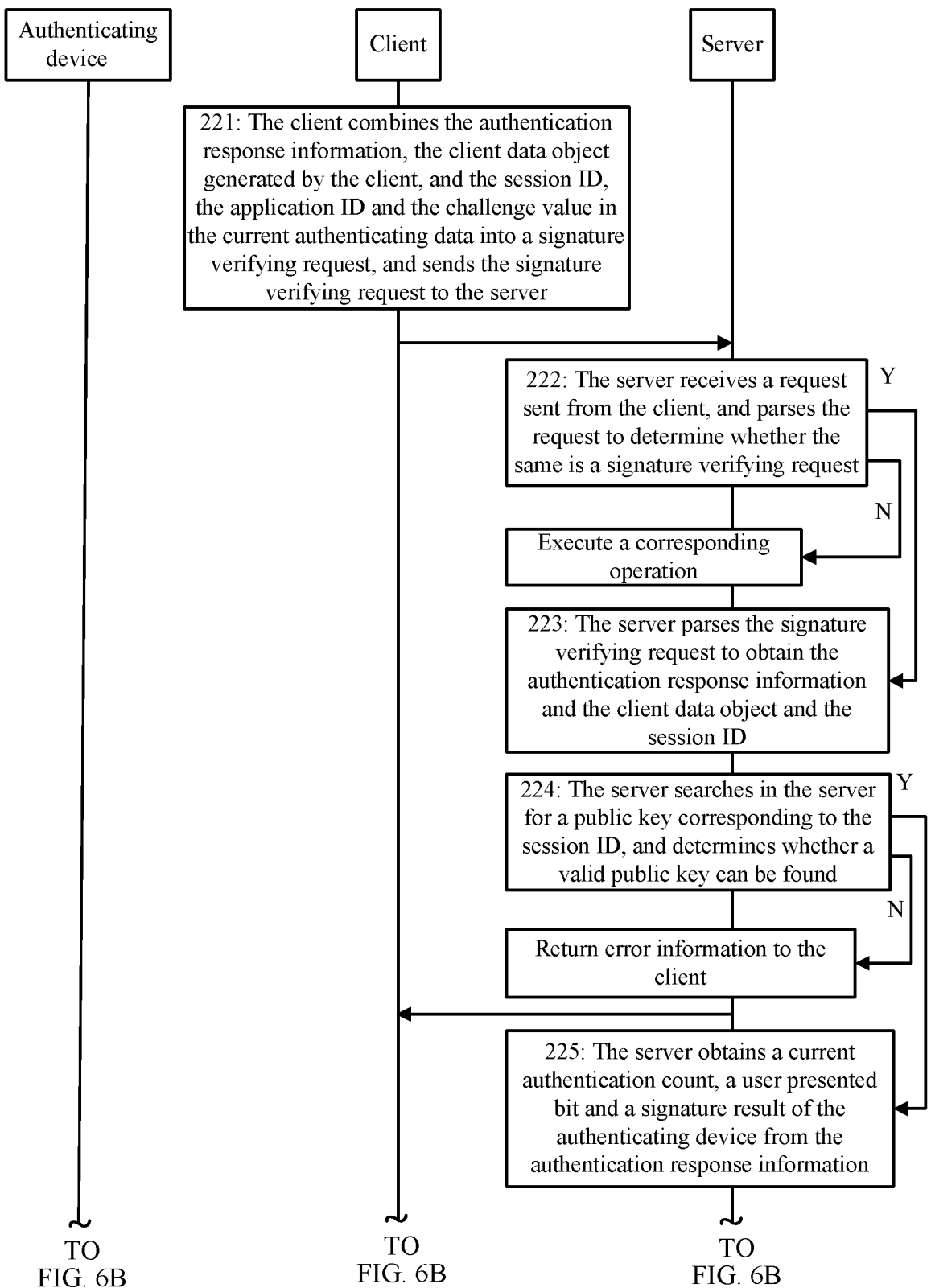
FIGS. 6A-6B are flowcharts illustrating a method for authenticating based on an authenticating device and provided by Embodiment 3 of the present disclosure.
Figure 6B:
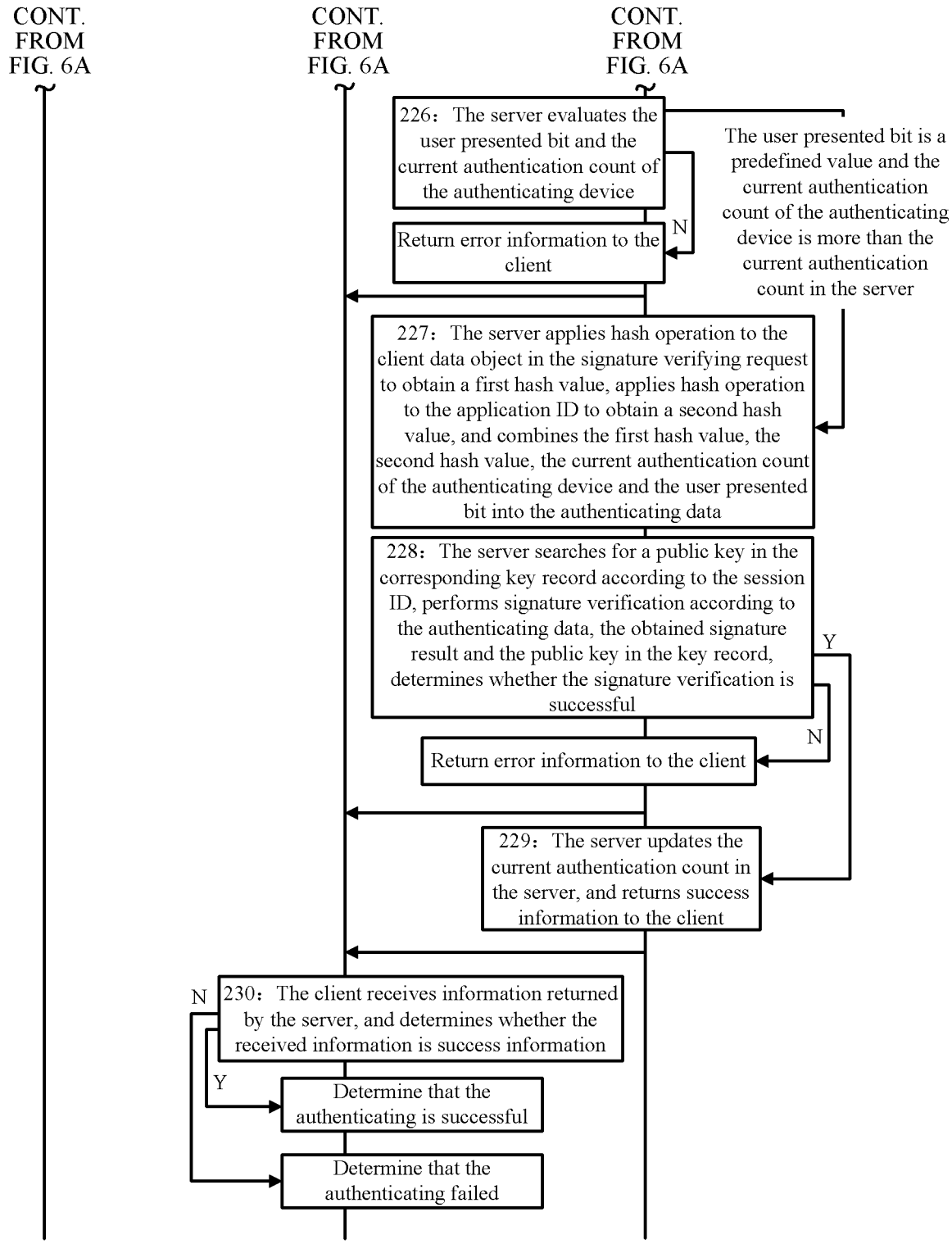

The disclosed Embodiment 1 provides a method for authenticating based on an authenticating device. FIGS. 1A-1B are flowcharts illustrating a method for authenticating based on an authenticating device and provided by Embodiment 1 of the present disclosure. As shown in FIGS. 1A-1B, the method particularly includes the following steps:

Step S1: a client obtains a uniform resource identifier, obtains an application ID according to the uniform resource identifier, obtains a device authenticating request according to the application ID and a user identification input by a user, and sends the device authenticating request to a server.

Step S2: the client receives current authenticating data sent by the server.

Step S3: the client obtains a client data object according to a challenge value in the current authenticating data, applies hash operation to the client data object and the application ID in the current authenticating data to obtain a client parameter, obtains a key identification in the current authenticating data, combines the client parameter, the key identification and key identification length into current authenticating request information, and sends the current authenticating request information to the authenticating device.

Specifically, the client parameter includes a challenge parameter and an application parameter; the client applies hash operation to the client data object to obtain the challenge parameter, and applies hash operation to the application ID in the current authenticating data to obtain the application parameter.

Step S4: the client receives information returned by the authenticating device, determines the type for the received information and, if the type is authentication fail information, determines that the authenticating is failed and the method terminates; or if the type is authentication response information, executes Step S5.

Step S5: the client combines the authentication response information, the client data object and a session ID in the current authenticating data into a signature verifying request, and sends the signature verifying request to the server.

Step S6: the client receives information returned by the server, determines whether the received information is success information and, if yes, determines that the authenticating is successful, otherwise, determines that the authenticating is failed, and the method terminates.

In the present embodiment, when the server receives the signature verifying request, following steps are executed:

Step P4: the server parses the signature verifying request to obtain the authentication response information, the client data object and the session ID in the current authenticating data.

Step P5: the server obtains a current authentication count and a signature result of the authenticating device from the authentication response information.

Step P6: the server determines whether the current authentication count of the authenticating device is more than the current authentication count of the server and, if yes, executes Step P7, otherwise, returns error information to the client.

Step P7: the server searches for an application ID corresponding to the session ID, applies hash operation to the client data object and the application ID found in the searching to obtain a server parameter, and combines the server parameter and the current authentication count of the authenticating device into authenticating data.

Specifically, the server parameter includes a challenge parameter and an application parameter; the server applies hash operation to the client data object to obtain the challenge parameter, and applies hash operation to the application ID in the current authenticating data to obtain the application parameter.

Step P8: the server searches for a public key in the corresponding key record according to the session ID, performs signature verification according to the authenticating data, the signature result and the public key in the key record, determines whether the signature verification is successful and, if yes, executes Step P9, otherwise, returns error information to the client.

Step P9: the server updates the current authentication count in the server, and returns success information to the client.

In this embodiment, an authenticating device participates in a process of identity authentication and stores a private key of a user in the authenticating device, making it harder for cyber offenders to obtain this information. During the identity authentication, the private key will not be sent out, and after the identity has been authenticated successfully, the client will not keep any login information. Thus, rapid identity authentication is realized and security for Internet is improved.

Embodiment 2

The disclosed Embodiment 2 provides a method for authenticating based on an authenticating device. FIGS. 2A-2C and 3A-3C are flowcharts illustrating a method for authenticating based on an authenticating device and provided by Embodiment 2 of the present disclosure. As shown in FIGS. 2A-2C and 3A-3C, detailed steps of the method are as the following:

Step 101: a client obtains a uniform resource identifier, obtains an application ID according to the uniform resource identifier, obtains a device authenticating request according to the application ID and a user identification input by a user, and sends the device authenticating request to a server.

Specifically, if the client is a browser, the client may obtain as the application ID a header field from the Uniform Resource Identifier through which the client gains access. If the client is an Android system, the client may obtain content of the key identifier of a signed Android installation package as the uniform resource identifier. If the client is an iOS system, the client may obtain content of the iOS application identifier as the uniform resource identifier.

For example, if, in the present embodiment, the application ID is https://u2f.cloudentify.com, the user identification input by the user is: feitianuser-1439363493424, the client may send a device authenticating request as below to the server:

https://api-dfserv.cloudentify.com?u2fmethod=signData&userName=feitianuser-143 9363493424&appId=https://u2f.cloudentify.com Step 102: the server receives the device authenticating request and parses the device authenticating request to obtain the application ID and the user identification.

Step 103: the server searches in the server for a key record according to the user identification, determines whether any key record matching the user identification can be found and, if yes, obtains the first key record matching the user identification as a current key record and executing Step 104, otherwise, returns error information to the client.

Step 104: the server obtains a key identification in the current key record, generates a session ID and a challenge value which correspond to the key identification, combines a preset version number, the challenge value, the application ID, the session ID and the key identification into current authenticating data, and updates the authenticating data packet according to the current authenticating data.

Specifically, the authenticating data packet is initially empty, and by updating the authenticating data packet, current authenticating data is added to the authenticating data packet.

Preferably, in the present embodiment, the server generates a random number as the challenge value, then generates another random number as the session ID.

For example, if the challenge value is qwUhzrFCv2wpwDv1CMkyIQ, the preset version number is U2F_V2, the session ID is 8238acbf-3319-4d49-b86c-cd45797d2bd6, the application ID is https://u2f.cloudentify.com, the key identification in the current key record is GQWE3Oyf2fexWtgn4Y6oQs7M5C-BonVtLzG37nHHdHBr9FlDqFD1HAO5PZfWFLfSCGZk8ICrLHf9aNkFOkpdJw-72uY220zIRwHQ89jcBFNIdhK8rFzbaEP-Ptos1Gq1iTJ1qA9pD T61UOBokK-HI6dkwJk7VRGAKuj2XFos-nU29VhEudTeNVz90cfSQCf6nTNQTRuTXnYqMgWqtf6WREU8g5OVffVoeX0eq10bOWiaFlZzcuc-WULUHho-AfV661onMp2XR, the current authenticating data will be:

"appId":"https://u2f.cloudentify.com", "challenge":"qwUhzrFCv2wpwDv1CMkyIQ", "version":"U2F_V2", "sessionId":"feitianuser-1439363493424_8238acbf-3319-4d49-b86c-cd 45797d2bd6", "keyHandle":"GQWE3Oyf2fexWtgn4Y6oQs7M5C-BonVtLzG37nHHdHBr9F1DqFD1HAO5PZfWFLfSCGZk8ICrLHf9aNkF0kpdJw-72uY220zIRwHQ89jcBFNIdhK8rFz baEP-PtoslGq1iTJ1qA9pDT61UOBokK-HI6dkwJk7VRGAKuj2XFos-nU29VhEudTeNVz90cfSQCf6nTNQTRuTXnYqMgWqtf6WREU8g5OVffVoe-X0eq10bOWiaFlZzcucWULUHho-AfV661onMp2XR".

Step 105: the server determines whether any further key record matching the user identification can be found after the current key record and, if yes, takes the further key record matching the user identification after the current key record as an updated current key record and goes back to Step 104, otherwise, sends the authenticating data packet to the client.

Step 106: the client receives data sent by the server, determines whether the received data is error information and, if yes, determines that the authenticating is failed and terminates the authenticating; otherwise, the client determines the received data is authenticating data packet, obtains the first authenticating data in the authenticating data packet as current authenticating data, and executes Step 107.

Step 107: the client obtains the client data object according to the challenge value in the current authenticating data.

Specifically, the client combines a first preset string and the challenge value, and applies base64 encoding to the data obtained by the combining to obtain the client data object.

For example, if the first preset string is navigator.id.getAssertion, the client data object will be:

"clientData":
"eyJ0eXAiOiJuYXZpZ2F0b3IuaWQuZ2V0QXNzZXJ0-aW9uIiwiY2hhbGx1bmd1IjoicXdVaHpyRkN2Mndwd0R2MUNNa31-JUSIsImNpZF9wdWJrZXkiOnsia3R5IjoiRUMiLCJjcnYiOiJQLTI1NiIsIngiOiJBTmFMY3Ry-ajd6RE9weFR1RVF0eTB3RHR4R1IPdTZxOXBhUWVEb3V1V1ViSInkiOiJBT0xqSW-1JU3hCQ3hXM1FZVXhhdD1laXZleUk 2ejNuaEZtbURZb1RnaHhuRyJ9LCJvcmlnaW4iOiJod-
HRwczovL3UyZi5jbG91ZGVudGlme S5jb20ifQ".

Step 108: the client applies hash operation to the client data object to obtain a challenge parameter, applies hash operation to the application ID in the current authenticating data to obtain an application parameter, obtains the key identification in the current authenticating data, combines the challenge parameter, the application parameter, the key identification and key identification length into current authenticating request information, and sends the current authenticating request information to the authenticating device.

Specifically, in the present embodiment, the hash operation is of SHA256 algorithm.

Step 109: the authenticating device waits for receiving the current authenticating request information, and obtains the key identification in the current authenticating request information.

Step 110: the authenticating device searches in the authenticating device for a private key in a key pair corresponding to the key identification, determines whether a private key in a key pair corresponding to the key identification can be found and, if yes, executes Step 111, otherwise, returns authentication fail information to the client.

Specifically, when the authenticating device determines that a private key in a key pair corresponding to the key identification cannot be found, the authenticating device will return authentication fail information to the client, go back to Step 109, and continue waiting to receive current authenticating request information.

Step 111: the authenticating device obtains data to be signed according to the current authentication count of the authenticating device and the challenge parameter and the application parameter in the current authenticating request information, and waits to receive confirming information from the user.

In the present embodiment, the confirming information from the user includes key-press information. For example, if a preset key on the authenticating device is triggered, the authenticating device will determine that confirming information from the user is received.

Step 112: when the authenticating device receives the confirming information from the user, the authenticating device uses the private key corresponding to the key identification found in the searching to sign the data to be signed according to a signature algorithm to obtain the signature result, and updates the current authentication count for the authenticating device.

Specifically, in the present embodiment, the signature algorithm is elliptic curve digital signature algorithm (ECDSA). An initial value of the current authentication count of the current authenticating device is zero, and by updating the current authentication count of the authenticating device, the current authentication count of the authenticating device is incremented by one.

For example, a signature result may be:
AQAAAAgwRAIgVmzFftuZrSeknWd71GHp9LMV-SPPX64MGkTVvsrqA8rMC
IBWKt70tLiD1cpS5p_1WNc_BJXk1U-BIstsLsHDLzapL.

Step 113: the authenticating device combines the current authentication count of the authenticating device and the signature result obtained through the signing into the authentication response information, and sends the authentication response information to the client.

For example, authentication response information may be:

"signatureData":
"AQAAAAgwRAIgVmzFftuZrSeknWd71GHp9LMV-SPPX64M
GkTVvsrqA8rMCIBWKt70tLiD1cpS5p_1WNc_BJXk1U-BIstsLsHDLzapL"

Step 114: the client receives information returned by the authenticating device, determines the type for the received information and, if the type is authentication fail information, executes Step 115, or if the type is authentication response information, executes Step 116.

Step 115: the client determines whether any authenticating data is located after the current authenticating data in the authenticating data packet and, if yes, takes the authenticating data located after the current authenticating data as updated current authenticating data and goes back to Step 107, otherwise, determines that the authenticating is failed and the method terminates.

Step 116: the client combines the authentication response information, the client data object generated by the client, and a session ID in the current authenticating data into a signature verifying request, and sends the signature verifying request to the server.

For example, the client may send a signature verifying request as below to the server:
https://api-dfserv.cloudentify.com?u2fmethod=
signFinish&appId=https://u2f.cloudentify.com
&browserData=eyJ0eXAiOiJuYXZpZ2F0b3Iua-WQuZ2V0QXNzZXJ0aW9uIiwi
Y2hhbGxlbmdlIjoicXdVaHpyRkN2Mndwd0R2MUN-Na31JUSIsImNpZF9wdWJrZXkiOnsia
3R5IjoiRUMiLCJjcnYiOiJQLTI1NiIsIngiOiJBTmFM-Y3Ryajd6RE9weFR1RVF0eTB3RHR
4R1RPdTZxOXBhUWVEb3ViZ2w1ViIsInkiOiJBT0xq-SW1JU3hCQ3hXMlFZVXhhdDllaXZ
leUk2ejNuaEZtbURZb1RnaHhuRyJ9LCJvcmlnaW4i-OiJodHRwczovL3UyZi5jbG91ZGVud GlmeS5jb20ifQ
&signData=AQAAAAgwRAIgVmzFftuZrSekn-Wd71GHp9LMVSPPX64MGkT
VvsrqA8rMCIBWKt70tLiDlcpS5p_1WNc_BJXk1U-BIst-sLsHDLzapL
&challenge=qwUhzrFCv2wpwDv1CMkyIQ
&sessionId=8238acbf-3319-4d49-b86c-cd45797d2bd6.

Step 117: the server receives the signature verifying request, parses the signature verifying request to obtain the authentication response information, the client data object and the session ID in the current authenticating data.

Step 118: the server obtains a current authentication count and a signature result of the authenticating device from the authentication response information.

Step 119: the server determines whether the obtained current authentication count of the authenticating device is more than the current authentication count of the server and, if yes, executes Step 120, otherwise, returns error information to the client.

Specifically, the initial value is zero for the current authentication count in the server. By updating the current authentication count in the server, the current authentication count in the server is incremented by one.

Step 120: the server applies hash operation to the client data object in the signature verifying request to obtain a first hash value, searches for an application ID according to the session ID, applies hash operation to the application ID found to obtain a second hash value, and composes verifying data according to the first hash value, the second hash value and the current authentication count of the authenticating device.

Step 121: the server searches for a public key in the corresponding key record according to the session ID, performs signature verification according to the authenticating data, the obtained signature result and the public key in the key record, determines whether the signature verification is successful and, if yes, executes Step 122, otherwise, returns error information to the client.

Specifically, the server deciphers the obtained signature result according to the signature algorithm and the public key in the key record to obtain a deciphered signature result. The server verifies whether the deciphered signature matches the verifying data and, if yes, the signature verification is determined to be successful, otherwise, the signature verification is determined to have failed.

Step 122: the server updates the current authentication count in the server, and returns success information to the client.

Step 123: the client receives information returned by the server, determines whether the received information is success information and, if yes, determines that the authenticating is successful, otherwise, determines that the authenticating is failed.

In this embodiment, an authenticating device participates in a process of identity authentication and stores a private key of a user in the authenticating device, making it harder for cyber offenders to obtain this information. During the identity authentication, the private key will not be sent out, and after the identity has been authenticated successfully, the client will not keep any login information. Thus, rapid identity authentication is realized and security for Internet is improved.

Embodiment 3

The disclosed Embodiment 3 provides a method for authenticating based on an authenticating device. FIGS. 4A-4C, 5A-5C and 6A-6B are flowcharts illustrating a method for authenticating based on an authenticating device and provided by Embodiment 3 of the present disclosure. As shown in FIGS. 4A-4C, 5A-5C and 6A-6B, detailed steps of the method are as the following:

Step 201: a client obtains a uniform resource identifier, obtains an application ID according to the uniform resource identifier, obtains a device authenticating request according to the application ID, an application identification and a user identification input by a user, and sends the device authenticating request to a server.

Specifically, if the client is a browser, the client may take as the application ID a header field from the Uniform Resource Identifier through which the client gains access. If the client is an Android system, the client may obtain content of the key identifier of a signed Android installation package as the uniform resource identifier. If the client is an iOS system, the client may obtain content of the iOS application identifier as the uniform resource identifier.

For example, in the present embodiment, if the application ID is https://u2f.cloudentify.com; the application identification is 89F4D9133E7105CB2654 and the user identification input by the user is feitianuser-1439363493424, the client may send a device authenticating request as below to the server:

https://api-dfserv.cloudentify.com?u2fmethod=signData&appkey=89F4D9133E71 05CB2654&userName=feitianuser-1439363493424&appId=https://u2f.cloudentify.com.

Step 202: the server receives a request sent from the client, parses the request to determine whether the same is a device authenticating request and, if yes, executes Step 203, otherwise, executes a corresponding operation.

Step 203: the server parses the device authenticating request to obtain the application identification, the application ID and the user identification.

For example, the server may parse the device authenticating request to find out that the application ID is https://u2f.cloudentify.com, the application identification is 89F4D9133E7105CB2654, and the user identification is feitianuser-1439363493424.

Step 204: the server searches for an application record in the server according to the application identification, determines whether an application record matching the application identification can be found, and executes Step 205 if positive, or returns error information to the client if otherwise.

Step 205: the server obtains the application record matching the application identification, obtains a protected address in the application record, determines whether the application ID obtained through the parsing can be matched to the protected address, and executes Step 206 if positive, or returns error information to the client if otherwise.

Specifically, the server determines whether the application ID obtained through the parsing can be matched to the obtained protected address and, if yes, determines that the application ID matches the obtained protected address, otherwise, determines that no application ID can be matched to the obtained protected address.

Step 206: the server searches in the server for a key record according to the user identification, determines whether any key record matching the user identification can be found and, if yes, obtains the first key record matching the user identification as a current key record and executing Step 207, otherwise, returns error information to the client.

Step 207: the server obtains a key identification in the current key record, generates a session ID and a challenge value which correspond to the key identification, combines a preset version number, the challenge value, the application ID, the session ID and the key identification into current authenticating data, and updates the authenticating data packet according to the current authenticating data.

Specifically, the authenticating data packet is initially empty, and by updating the authenticating data packet, current authenticating data is added into the authenticating data packet.

Preferably, in the present embodiment, the server generates a random number as the challenge value, then generates another random number and combines the same with the user identification to produce the session ID.

For example, if the challenge value is qwUhzrFCv2wpwDv1CMkyIQ, the preset version number is U2F_V2, and the session ID is:

feitianuser-1439363493424_8238acbf-3319-4d49-b86c-cd45797d2bd6, the application ID is https://u2f.cloudentify.com, the key identification obtained from the current key record may be:

GQWE3Oyf2fexWtgn4Y6oQs7M5C-BonVtLzG37nHHdHBr9FlDqFD1HAO5PZ fWFLfSCGZk8ICrLHf9aNkF0kpdJw-72uY220zIRwHQ89jcBFNIdhK8rFzbaEP-PtoslGq1iTJ 1qA9pDT61UOBokK-HI6dkwJk7VRGAKuj2XFos-nU29VhEudTeNVz90cfSQCf6nTNQTR uTXnYqMgWqtf6WREU8g5OVffVoeX0eq10bOWiaFlZ-zcucWULUHho-AfV661onMp2XR.

the current authenticating data will be:

"appId":"https://u2f.cloudentify.com", "challenge": "qwUhzrFCv2wpwDv1CMkyI Q","version":"U2F_V2", "sessionId":"feitianuser-1439363493424_8238acbf-3319-4d49-b86c-cd45797d2bd6","keyHandle": "GQWE3Oyf2fexWtgn4Y6oQs7M5C-BonVtLzG37nHHdHB r9FlDqFD1HAO5PZfWFLfSCGZk8ICrLHf9aNkFOkpdJw-72uY220zIRwHQ89jcBFNIdhK8 rFzbaEP-PtoslGq1iTJ1qA9pDT61UOBokK-HI6dkwJk7VRGAKuj2XFos-nU29VhEudTeNV z90cfSQCf6nTNQTRuTXnYqMgWqtf6WREU8g5OVff-VoeX0eq10bOWiaFlZzcucWULUH ho-AfV661onMp2XR".

Step 208: the server determines whether any further key record matching the user identification can be found after the current key record and, if yes, takes the further key record matching the user identification after the current key record as an updated current key record and goes back to Step 207, otherwise, sends the authenticating data packet to the client, and executes Step 209.

Step 209: the client receives data sent by the server, evaluates the received data, and determines the authenticating has failed if the data is error information, or executes Step 210 if the data is an authenticating data packet.

Step 210: the client obtains the first authenticating data in the authenticating data packet as current authenticating data.

Step 211: the client obtains the application ID in the current authenticating data, verifies the obtained application ID to determine whether the application ID is correct and, if yes, executes Step 212, otherwise, determines that the authentication is failed, and the method terminates.

Step 212: the client obtains the client data object according to the challenge value and the application ID in the current authenticating data.

Specifically, the client combines a first preset string, the challenge value and the application ID, and applies base64 encoding to data obtained by the combining to obtain the client data object.

For example, if the first preset string is navigator.id.getAssertion, the client data object will be:
"clientData":
"eyJ0eXAiOiJuYXZpZ2F0b3IuaWQuZ2V0QXNzZXJ0-aW9uIiwiY2
hhbGx1bmd1IjoicXdVaHpyRkN2Mndwd0R2MUNNa31-JUSIsImNpZF9wdWJrZXkiOnsia3R
5IjoiRUMiLCJjcnYiOiJQLTI1NiIsIngiOiJBTmFMY3Ry-ajd6RE9weFR1RVF0eTB3RHR4R1
RPdTZxOXBhUWVEb3ViZ2w1ViIsInkiOiJBT0xqSW1J-U3hCQ3hXM1FZVXhhdD11aXZ1eU
k2ejNuaEZtbURZb1RnaHhuRyJ9LCJvcmlnaW4iOiJod-HRwczovL3UyZi5jbG91ZGVudGlm eS5jb20ifQ".

Step 213: the client applies hash operation to the client data object to obtain a challenge parameter, applies hash operation to the application ID in the current authenticating data to obtain an application parameter, obtains the key identification in the current authenticating data, combines the challenge parameter, the application parameter, the key identification and key identification length into current authenticating request information, and sends the current authenticating request information to the authenticating device.

Specifically, in the present embodiment, the hash operation is a SHA256 algorithm.

Step 214: the authenticating device waits to receive the current authenticating request information, and obtains the key identification in the current authenticating request information.

Step 215: the authenticating device searches in the authenticating device for a private key in a key pair corresponding to the key identification, determines whether a private key in a key pair corresponding to the key identification can be found and, if yes, executes Step 216, otherwise, returns authentication fail information to the client.

Specifically, when the authenticating device determines that a private key in a key pair corresponding to the key identification cannot be found, the authenticating device will return authentication fail information to the client, go back to Step 214, and continue waiting to receive current authenticating request information.

Step 216: the authenticating device obtains data to be signed according to the current authentication count of the authenticating device, a user presented bit, and the challenge parameter and the application parameter in the current authenticating request information, and waits to receive confirming information from the user.

In the present embodiment, the confirming information from the user includes key-press information. For example, if a preset key on the authenticating device is triggered, the authenticating device will determine that confirming information from the user is received.

After Step 216, the method further includes that the authenticating device determines whether the confirming information from the user is received within a preset time interval and, if yes, executes Step 217, otherwise, returns authentication fail information to the client.

Step 217: when the authenticating device receives the confirming information from the user, the authenticating device uses the private key corresponding to the key identification found in the searching to sign the data to be signed according to a signature algorithm to obtain the signature result, and updates the current authentication count for the authenticating device.

Specifically, in the present embodiment, the signature algorithm is Elliptic Curve Digital Signature Algorithm (ECDSA).

For example, a signature result may be:
AQAAAAgwRAIgVmzFftuZrSeknWd71GHp9LM-VSPPX64MGkTVvsrqA8rMC
IBWKt70tLiDlcpS5p_1WNc_BJXklU-BIstsLsHDLzapL.

Step 218: the authenticating device combines the current authentication count of the authenticating device, the user presented bit, and the signature result obtained through the signing into the authentication response information, and sends the authentication response information to the client.

Step 219: the client receives information returned by the authenticating device, determines the type for the received information and, if the type is authentication fail information, executes Step 220, or if the type is authentication response information, executes Step 221.

Step 220: the client determines whether any authenticating data is located after the current authenticating data in the authenticating data packet and, if yes, takes the authenticating data located after the current authenticating data as updated current authenticating data and goes back to Step 211, otherwise, determines that the authenticating is failed and the method terminates.

Step 221: the client combines the authentication response information, the client data object generated by the client, and the session ID, the application ID and the challenge value in the current authenticating data into a signature verifying request, and sends the signature verifying request to the server.

For example, the client may send a signature verifying request as below to the server:

https://api-dfserv.cloudentify.com?u2fmethod=
signFinish&appkey=89F4D9133E7 105CB2654&appId=
https://u2f.cloudentify.com
&browserData=eyJ0eXAiOiJuYXZpZ2F0b3IuaWQu-
Z2VOQXNzZXJ0aW9uIiwi
Y2hhbGxlbmdlIjoicXdVaHpyRkN2Mndwd0R2MUNNa-
31JUSIsImNpZF9wdWJrZXkiOnsia
3R5IjoiRUMiLCJjcnYiOiJQLTI1NiIsIngiOiJBTmFMY-
3Ryajd6RE9weFR1RVF0eTB3RHR
4R1RPdTZxOXBhUWVEb3ViZ2w1ViIsInkiOiJBT0xq-
SW1JU3hCQ3hXMlFZVXhhdDllaXZ
leUk2ejNuaEZtbURZb1RnaHhuRyJ9LCJvcmlnaW4iOiJ-
odHRwczovL3UyZi5jbG91ZGVud GlmeS5jb20ifQ
&signData=AQAAAAgwRAIgVmzFftuZrSeknWd71-
GHp9LMVSPPX64MGkT
VvsrqA8rMCIBWKt70tLiDlcpS5p_1WNc_BJXklU-BIst-
sLsHDLzapL
&challenge=qwUhzrFCv2wpwDv1CMkyIQ
&sessionId=feitianuser-1439363493424_8238acbf-3319-
4d49-b86c-cd45797d2bd 6.

Step 222: the server receives a request sent from the client, parses the request to determine whether the same is a signature verifying request and, if yes, executes Step 223, otherwise, executes a corresponding operation.

Step 223: the server parses the signature verifying request to obtain the authentication response information, the client data object and the session ID.

Step 224: the server searches in the server for a public key corresponding to the session ID, determines whether a valid public key can be found and, if yes, executes Step 225, otherwise, returns error information to the client.

In the present embodiment, the Step 224 may further include: the server searches for the application ID and the challenge value in the server according to the session ID in the signature verifying request, determines whether the application ID and the challenge value found can be individually matched to the received application ID and the challenge value and, if yes, execute Step 224; otherwise, return error information to the client.

Step 225: the server obtains a current authentication count, a user presented bit and a signature result of the authenticating device from the authentication response information.

Step 226: the server evaluates the user presented bit and the current authentication count of the authenticating device and, if the user presented bit is a preset value and the current authentication count of the authenticating device is more than the current authentication count in the server, executes Step 227, otherwise, returns error information to the client.

Step 227: the server applies hash operation to the client data object in the signature verifying request to obtain a first hash value, applies hash operation to the application ID to obtain a second hash value, and combines the first hash value, the second hash value, the current authentication count of the authenticating device and the user presented bit into the authenticating data.

Step 228: the server searches for a public key in the corresponding key record according to the session ID, performs signature verification according to the authenticating data, the obtained signature result and the public key in the key record, determines whether the signature verification is successful and, if yes, executes Step 229, otherwise, returns error information to the client.

Specifically, the server deciphers the obtained signature result according to the signature algorithm and the public key in the key record to obtain a deciphered signature result.

The server verifies whether the deciphered signature matches the verifying data and, if yes, the signature verification is determined to be successful, otherwise, the signature verification is determined to have failed.

Step 229: the server updates the current authentication count in the server, and returns success information to the client.

Step 230: the client receives information returned by the server, determines whether the received information is success information and, if yes, determines that the authenticating is successful, otherwise, determines that the authenticating is failed.

In this embodiment, an authenticating device participates in a process of identity authentication and stores a private key of a user in the authenticating device, making it harder for cyber offenders to obtain this information. During the identity authentication, the private key will not be sent out, and after the identity has been authenticated successfully, the client will not keep any login information. Thus, rapid identity authentication is realized and security for Internet is improved.

Embodiment 4

Figure 7:
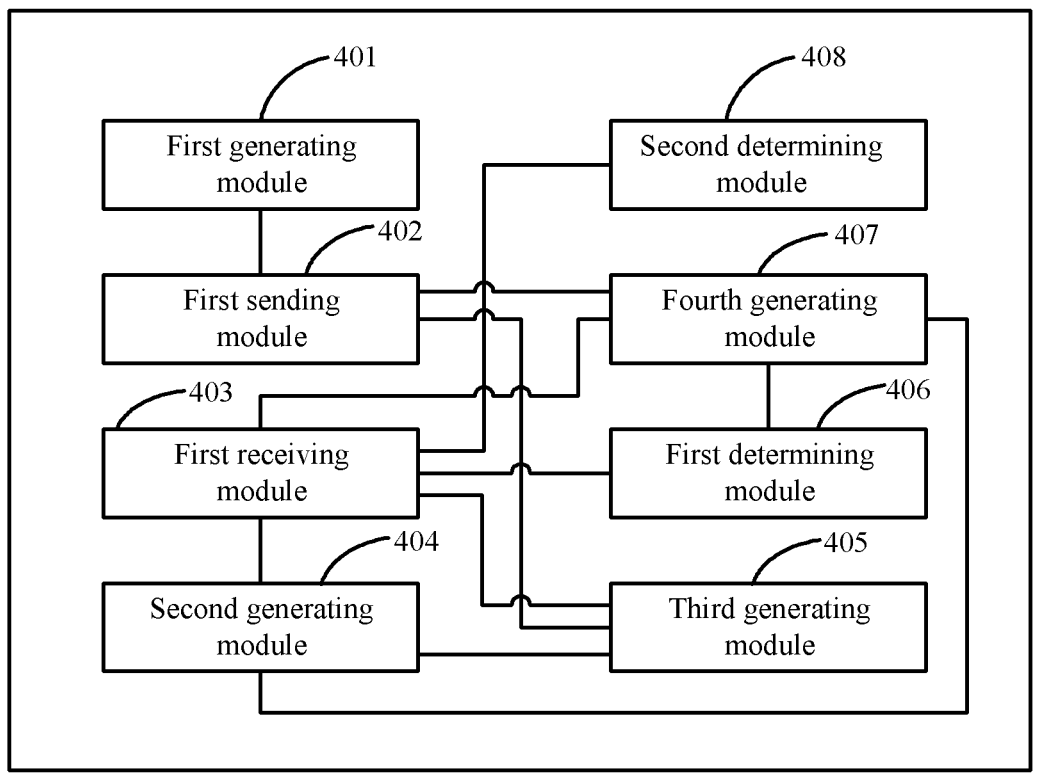
FIG. 7 is a structural diagram illustrating a client for authenticating based on an authenticating device and provided by Embodiment 4 of the present disclosure.

The disclosed Embodiment 4 provides a client for authenticating based on an authenticating device. FIG. 7 is a structural diagram illustrating a client for authenticating based on an authenticating device and provided by Embodiment 4 of the present disclosure. As shown in FIG. 7, the client includes: a first generating module 401, a first sending module 402, a first receiving module 403, a second generating module 404, a third generating module 405, a first determining module 406, a fourth generating module 407 and a second determining module 408.

The first generating module 401 is configured to obtain a uniform resource identifier, obtain an application ID according to the uniform resource identifier, and obtain a device authenticating request according to the application ID and a user identification input by a user.

The first sending module 402 is configured to send the device authenticating request generated by the first generating module 401 to the server, send current authenticating request information generated by the third generating module 405 to the authenticating device, and send a signature verifying request generated by the fourth generating module 407 to the server.

The first receiving module 403 is configured to receive current authenticating data returned by the server, receive information returned by the authenticating device, and receive information returned by the server.

The second generating module 404 is configured to obtain a client data object according to a challenge value in the current authenticating data received by the first receiving module 403.

The third generating module 405 is configured to apply hash operation to the client data object generated by the second generating module 404 and the application ID in the current authenticating data received by the first receiving module 403 to obtain a client parameter, obtain the key identification in the current authenticating data, and combine the client parameter, the key identification and key identification length into the current authenticating request information.

The first determining module 406 is configured to determine the type for information returned by the authenticating device and received by the first receiving module 403 and, if the type is authentication fail information, determine that the authenticating is failed and terminate the authenticating.

The fourth generating module 407 is configured to, when the first determining module 406 determines that the information returned by the authenticating device is authentication response information, combine the authentication response information, the client data object generated by the second generating module 404, and the session ID in the current authenticating data received by the first receiving module 403 into the signature verifying request.

The second determining module 408 is configured to determine whether the information returned by the server and received by the first receiving module 403 is success information and, if yes, determine that the authenticating is successful, otherwise, determine that the authenticating is failed.

Further, the first receiving module 403 is specifically configured to receive data sent by the server, receive information returned by the authenticating device, and receive information returned by the server.

The client further includes a third determining module, configured to determine whether the data sent by the server and received by the first receiving module 403 is error information and, if yes, determine that the authenticating is failed and terminate the authenticating, otherwise, determine that the received data is the current authenticating data and trigger the second generating module 404 to operate.

Further, the first receiving module 403 is also configured to receive an authenticating data packet sent by the server.

The client further includes a first obtaining module and a fourth determining module.

The first obtaining module is configured to obtain a first authenticating data in the authenticating data packet received by the first receiving module 403 as current authenticating data, and when the fourth determining module determines that additional authenticating data is located after the current authenticating data in the authenticating data packet, take the authenticating data after the current authenticating data as updated current authenticating data.

The second generating module 404 is further configured to obtain the client data object according to the challenge value in the current authenticating data obtained by the first obtaining module.

The fourth determining module is configured to, when the first determining module 406 determines that the information returned by the authenticating device is authentication fail information, determine whether any authenticating data is located after the current authenticating data in the authenticating data packet received by the first receiving module 403 and, if yes, trigger the first obtaining module to operate, otherwise, determine that the authenticating is failed and terminate the authenticating.

Further, the first receiving module 403 is specifically configured to receive data sent by the server, receive information returned by the authenticating device, and receive information returned by the server.

The client further includes a fifth determining module, configured to determine whether the data sent by the server and received by the first receiving module 403 is error information and, if yes, determine that the authenticating is failed and terminate the authenticating, otherwise, determine that the received data is the authenticating data packet and trigger the first obtaining module to operate.

The client further includes a sixth determining module, configured to obtain the application ID in the current authenticating data received by the first receiving module 403, verify the obtained application ID to determine whether the application ID is correct and, if yes, trigger the second generating module 404 to operate, otherwise, determine that the authenticating is failed and terminate the authenticating.

Further, the second generating module 404 is specifically configured to combine a first preset string and the challenge value, and apply base64 encoding to the combination to obtain the client data object.

In this embodiment, an authenticating device participates in a process of identity authentication and stores a private key of a user in the authenticating device, making it harder for cyber offenders to obtain this information. During the identity authentication, the private key will not be sent out, and after the identity has been authenticated successfully, the client will not keep any login information. Thus, rapid identity authentication is realized and security for Internet is improved.

Embodiment 5

Figure 8:
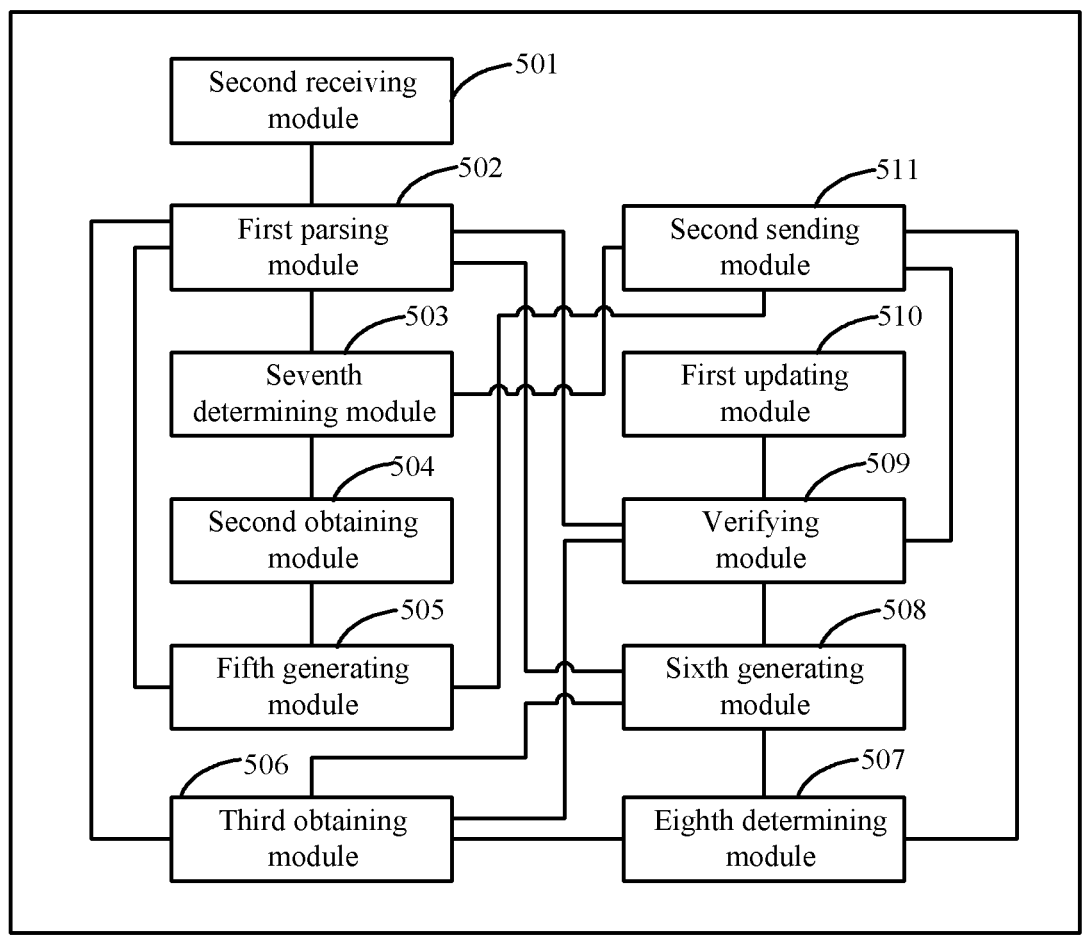
FIG. 8 is a structural diagram illustrating a server for authenticating based on an authenticating device and provided by Embodiment 5 of the present disclosure.

The disclosed Embodiment 5 provides a server for authenticating based on an authenticating device. FIG. 8 is a structural diagram illustrating a server for authenticating based on an authenticating device and provided by Embodiment 5 of the present disclosure. As shown in FIG. 8, the server includes: a second receiving module 501, a first parsing module 502, a seventh determining module 503, a second obtaining module 504, a fifth generating module 505, a third obtaining module 506, an eighth determining module 507, a sixth generating module 508, a verifying module 509, a first updating module 510 and a second sending module 511.

The second receiving module 501 is configured to receive a device authenticating request sent by a client, and receive a signature verifying request sent by the client.

The first parsing module 502 is configured to parse the device authenticating request received by the second receiving module 501 to obtains an application ID and a user identification, parse the signature verifying request received by the second receiving module 501 to obtain authentication response information, a client data object and a session ID in the current authenticating data.

The seventh determining module 503 is configured to search for a key record in the server according to the user identification obtained through parsing by the first parsing module 502, and determine whether any key record matching the user identification can be found.

The second obtaining module 504 is configured to, when the seventh determining module 503 determines that a key record matching the user identification can be found, and obtains the key record as current key record.

The fifth generating module 505 is configure to obtain the key identification from the current key record obtained by the second obtaining module 504, generate a session ID and a challenge value which correspond to the key identification, and combine the challenge value, the session ID, the application ID and the key identification obtained through parsing by the first parsing module 502 into the current authenticating data.

The third obtaining module 506 is configured to obtain the current authentication count of the authenticating device and a signature result from the authentication response information obtained through parsing by the first parsing module 502.

The eighth determining module 507 is configured to determine whether the current authentication count of the authenticating device obtained by the third obtaining module 506 is more than the current authentication count in the server and, if not, return error information to the client.

The sixth generating module 508 is configured to determine, when the eighth determining module 507 determines that the current authentication count of the authenticating device is more than the current authentication count in the server, search for an application ID corresponding to the session ID obtained through parsing by the first parsing module 502, apply hash operation to the client data object obtained through parsing by the first parsing module 502 and the application ID found in the searching to obtain a server parameter, and combine the server parameter and the current authentication count of the authenticating device obtained by the third obtaining module 506 into authenticating data.

The verifying module 509 is configured to search for a public key in the key record corresponding to the session ID obtained through parsing by the first parsing module 502, perform signature verification according to the authenticating data generated by the sixth generating module 508, the signature result obtained by the third obtaining module 506 and the public key in the key record found in the searching, and determine whether the signature verification is successful.

The first updating module 510 is configured to update the current authentication count in the server when the verifying module 509 determines that the signature verification is successful.

The second sending module 511 is configure to return error information to the client when the seventh determining module 503 determines that a key record matching the user identification cannot be found, send the current authenticating data generated by the fifth generating module 505 to the client, return error information to the client when the eighth determining module 507 determines that the current authentication count of the authenticating device is not more than the current authentication count in the server, return success information to the client when the verifying module 509 determines that the signature verification is successful, or return error information to the client when the verifying module 509 determines that the signature verification is failed.

Further, the first parsing module 502 is also configured to parse the device authenticating request received by the second receiving module 501 to obtain an application identification.

The server further includes a ninth determining module and a tenth determining module.

The ninth determining module is configured to search for an application record in the server according to the application identification obtained through parsing by the first parsing module 502, and determine whether an application record matching the application identification can be found.

The tenth determining module is configured to, when the ninth determining module determines that an application record matching the application identification can be found, obtain the application record matching the application identification, obtain a protected address in the application record, determine whether the application ID obtained through parsing matches the obtained protected address and, if yes, trigger the seventh determining module 503 to operate.

The second sending module 511 is further configured to return error information to the client when the ninth determining module determines that an application record matching the application identification cannot be found, and/or when the tenth determining module determines that the application ID obtained through parsing does not match the obtained protected address.

Further, the second obtaining module 504 is specifically configured to obtain the first key record matching the user identification as the current key record.

The fifth generating module 505 is further configured to obtain a key identification in the current key record obtained by the second obtaining module 504, generate a session ID and a challenge value which correspond to the key identification, combine the challenge value, the application ID, the session ID and the key identification into current authenticating data, and update the authenticating data packet according to the current authenticating data.

The server further includes an eleventh determining module, configured to determine whether any further key record after the current key record can be matched to the user identification.

The second obtaining module 504 is further configured to, when the eleventh determining module determines that a further key record after the current key record can be matched to the user identification, take the further key record after the current key record matching the user identification as the updated current key record.

The second sending module 511 is further configured to, when the eleventh determining module determines that no further key record after the current key record can be matched to the user identification, send the authenticating data packet generated by the fifth generating module 505 to the client.

The server further includes a twelfth determining module, configured to search for a public key in the server corresponding to the session ID obtained through parsing by the first parsing module 502, determine whether a valid public key can be found and, if yes, trigger the third obtaining module 506 to operate.

The second sending module 511 is further configured to return error information to the client when the twelfth determining module determines that a valid public key cannot be found.

Further, the third obtaining module 506 is further configured to obtain the user presented bit from the authentication response information.

The server further includes a thirteenth determining module, configured to determine whether the user presented bit obtained by the third obtaining module 506 is a preset value and, if yes, trigger the sixth generating module 508 to operate.

The second sending module 511 is further configured to return error information to the client when the thirteenth determining module determines that the user presented bit is not the preset value.

In this embodiment, an authenticating device participates in a process of identity authentication and stores a private key of a user in the authenticating device, making it harder for cyber offenders to obtain this information. During the identity authentication, the private key will not be sent out. Thus, rapid identity authentication is realized and security for Internet is improved.

Embodiment 6

Figure 9:
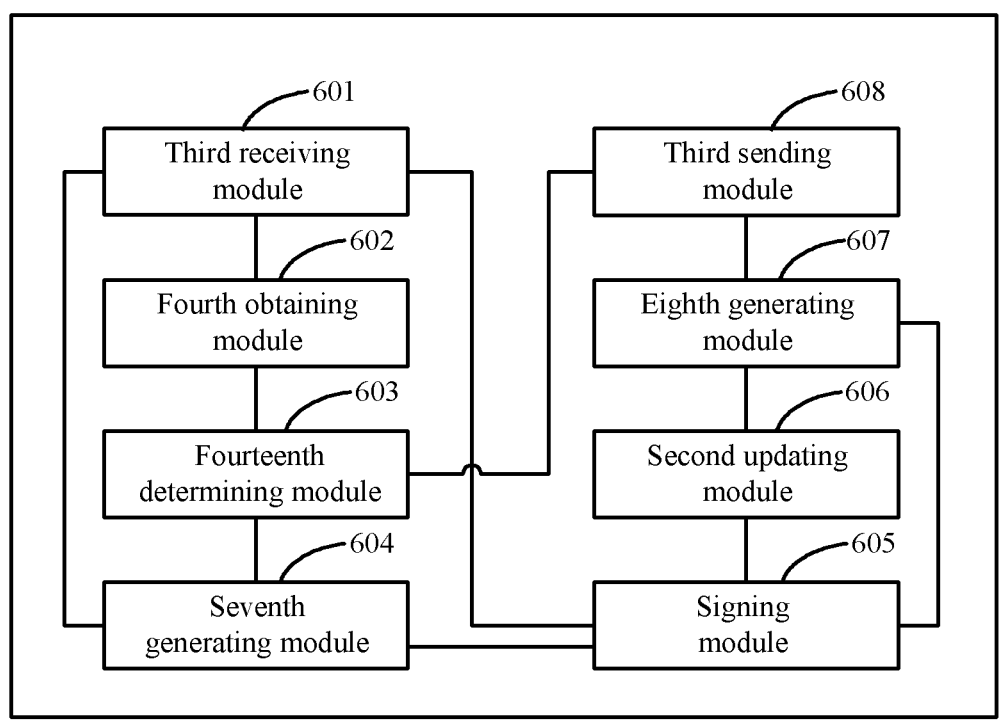
FIG. 9 is a structural diagram illustrating an authenticating device for authenticating based on the authenticating device and provided by Embodiment 6 of the present disclosure.

The disclosed Embodiment 6 provides an authenticating device for authenticating based on the authenticating device. FIG. 9 is a structural diagram illustrating an authenticating device for authenticating based on the authenticating device and provided by Embodiment 6 of the present disclosure. As shown in FIG. 9, the authenticating device includes: a third receiving module 601, a fourth obtaining module 602, a fourteenth determining module 603, a seventh generating module 604, a signing module 605, a second updating module 606, an eighth generating module 607 and a third sending module 608.

The third receiving module 601 is configured to wait for receiving current authenticating request information sent by the client, and wait to receive confirming information from the user.

The fourth obtaining module 602 is configured to obtain the key identification in the current authenticating request information received by the third receiving module 601.

The fourteenth determining module 603 is configured to search the authenticating device for a private key in a key pair corresponding to the key identification obtained by the fourth obtaining module 602, and determine whether any private key in a key pair corresponding to the key identification can be found.

The seventh generating module 604 is configured to, when the fourteenth determining module 603 determines that a private key in a key pair corresponding to the key identification can be found, obtain data to be signed according to the current authentication count of the authenticating device and the client parameter in the current authenticating request information received by the third receiving module 601.

The signing module 605 is configured to, when the third receiving module 601 receives the confirming information from the user, use the found private key corresponding to the key identification to sign the data to be signed, which is generated by the seventh generating module 604, according to a signature algorithm to obtain a signature result.

The second updating module 606 is configured to update the current authentication count for the authenticating device when the signing module 605 performs the signing.

The eighth generating module 607 is configured to combine the current authentication count of the authenticating device obtained through updating by the second updating module 606 and the signature result obtained through signing by the signing module 605 into authentication response information.

The third sending module 608 is configured to return authentication fail information to the client when the fourteenth determining module 603 determines that a private key in a key pair corresponding to the key identification cannot be found, and send the authentication response information generated by the eighth generating module 607 to the client.

Further, the eighth generating module 607 is specifically configured to combine the current authentication count of the authenticating device, a user presented bit and the signature result into the authentication response information.

In this embodiment, an authenticating device participates in a process of identity authentication and stores a private key of a user in the authenticating device, making it harder for cyber offenders to obtain this information. During the identity authentication, the private key will not be sent out, and after the identity has been authenticated successfully, the client will not keep any login information. Thus, rapid identity authentication is realized and security for Internet is improved.

What is described above are merely some of the preferred specific implementations of, rather than limitation on the protection scope of, the present disclosure. Any and all variation and/or substitution readily conceivable by those of ordinary skill in the art within the technical scope disclosed in the present disclosure shall fall within the protection scope of the present disclosure. Therefore, the protection scope of the present disclosure shall be subject to the appended claims.

What is claimed is:

1. A method for authenticating based on an authenticating device, comprising:

Step S1: by a client, obtaining a uniform resource identifier, obtaining an application ID according to the uniform resource identifier, obtaining a device authenticating request according to the application ID and a user identification input by a user, and sending the device authenticating request to a server, wherein the client is one of a browser, an Android system or an iOS system, and when the client is the browser, the uniform resource identifier is an address being accessed, when the client is the Android system, the uniform resource identifier is a content of a key identifier of a signed Android installation package, and when the client is the iOS system, the uniform resource identifier is a content of an iOS application identifier;

Step P1: parsing, by the server, the device authenticating request to obtain the application ID and the user identification;

Step P2: by the server, searching in the server for a key record according to the user identification, determining whether any key record matching the user identification can be found and, if yes, obtaining the key record as a current key record and executing Step P3, otherwise, returning error information to the client; and Step P3: by the server, obtaining a key identification in the current key record, generating a session ID and a challenge value which correspond to the key identification, combining the challenge value, the application ID, the session ID and the key identification into current authenticating data, and sending the current authenticating data to the client;

Step S2: receiving, by the client, current authenticating data sent by the server;

Step S3: by the client, obtaining a client data object according to a challenge value in the current authenticating data, applying hash operation to the client data object and the application ID in the current authenticating data to obtain a client parameter, obtaining a key identification in the current authenticating data, combining the client parameter, the key identification and key identification length into current authenticating request information, and sending the current authenticating request information to the authenticating device;

Step S4: by the client, receiving information returned by the authenticating device, determining the type for the received information and, if the type is authentication fail information, determining that the authenticating is failed and the method terminates, or if the type is authentication response information, executing Step S5;

Step S5: by the client, combining the authentication response information, the client data object and the session ID in the current authenticating data into a signature verifying request, and sending the signature verifying request to the server; and Step S6: by the client, receiving information returned by the server, determining whether the received information is success information and, if yes, determining that the authenticating is successful, otherwise, determining that the authenticating is failed;

wherein when the client determines that the received information is the authentication fail information in Step S4, the method further comprises:

by the client, determining whether any authenticating data is located after the current authenticating data in the authenticating data packet and, if yes, taking the authenticating data located after the current authenticating data as updated current authenticating data and going back to Step S3, otherwise, determining that the authenticating is failed and the method terminates.

2. The method of claim 1, wherein Step S2 comprises:
by the client, receiving data sent by the server, determining whether the received data is error information and, if yes, determining that the authenticating is failed and the method terminates, otherwise, by the client, determining that the received data is current authenticating data and executing Step S3.

3. The method of claim 1, wherein Step S2 comprises:
Step S2-1: by the client, receiving an authenticating data packet sent by the server, obtaining a first authenticating data in the authenticating data packet as the current authenticating data, and executing Step S3.

4. The method of claim 1, wherein before Step S3, the method further comprises:
by the client, obtaining the application ID in the current authenticating data, verifying the obtained application ID to determine whether the application ID is correct and, if yes, executing Step S3, otherwise, determining that the authentication is failed, and the method terminates.

5. The method of claim 1, wherein the obtaining client data object according to the challenge value in the current authenticating data comprises:
by the client, combining a first preset string, the challenge value, and the application ID, and applying base64 encoding to data obtained by the combining to obtain the client data object.

6. The method of claim 1, wherein Step P1 further comprises:
parsing, by the server, the device authenticating request to obtain the application identification;
and before Step P2, the method further comprises:
Step P1-1: by the server, searching for an application record in the server according to the application identification, determining whether any application record matching the application identification can be found and, if yes, executing Step P1-2, otherwise, returning error information to the client; and
Step P1-2: by the server, obtaining the application record matching the application identification, obtaining a protected address in the application record, determining whether the application ID obtained through the parsing can be matched to the protected address and, if yes, executing Step P2, otherwise, returning error information to the client.

7. The method of claim 1, wherein Step P2 comprises:
when the server determines that a key record matching the user identification can be found, obtaining a first key record matching the user identification as the current key record, and executing Step P3; and
Step P3 comprises:
Step P3-1: by the server, obtaining a key identification in the current key record, generating a session ID and a challenge value which correspond to the key identification, combining the challenge value, the application ID, the session ID and the key identification into current authenticating data, and updating the authenticating data packet according to the current authenticating data; and
Step P3-2: by the server, determining whether any further key record matching the user identification can be found after the current key record and, if yes, taking the further key record matching the user identification after the current key record as an updated current key record and going back to Step P3-1, otherwise, sending the authenticating data packet to the client.

8. The method of claim 1, wherein after Step S5, the server executes the following steps:
Step P4: parsing, by the server, the signature verifying request to obtain the authentication response information, the client data object and the session ID in the current authenticating data;
Step P5: obtaining, by the server, a current authentication count and a signature result of the authenticating device from the authentication response information;
Step P6: by the server, determining whether the current authentication count of the authenticating device is more than the current authentication count of the server and, if yes, executing Step P7, otherwise, returning error information to the client;
Step P7: by the server, searching for an application ID corresponding to the session ID, applying hash operation to the client data object and the application ID found in the searching to obtain a server parameter, and combining the server parameter and the current authentication count of the authenticating device into authenticating data;
Step P8: by the server, searching for a public key in the corresponding key record according to the session ID, performing signature verification according to the authenticating data, the signature result and the public key in the key record, determining whether the signature verification is successful and, if yes, executing Step P9, otherwise, returning error information to the client; and
Step P9: by the server, updating the current authentication count in the server, and returning success information to the client.

9. The method of claim 1, wherein after Step S3, the authenticating device executes the following steps:
StepQ1: by the authenticating device, waiting to receive the current authenticating request information, and obtaining the key identification in the current authenticating request information;
StepQ2: by the authenticating device, searching in the authenticating device for a private key in a key pair corresponding to the key identification, determining whether a private key in a key pair corresponding to the key identification can be found and, if yes, executing StepQ3, otherwise, returning authentication fail information to the client;
StepQ3: by the authenticating device, obtaining data to be signed according to the current authentication count of the authenticating device and the client parameter in the current authenticating request information, and waiting to receive confirming information from the user;
StepQ4: when the authenticating device receives the confirming information from the user, using, by the authenticating device, the private key corresponding to the key identification found in the searching to sign the data to be signed according to a signature algorithm to obtain the signature result, and updating the current authentication count for the authenticating device; and StepQ5: by the authenticating device, combining the current authentication count of the authenticating device and the signature result into the authentication response information, and sending the authentication response information to the client.

\* \* \* \* \*

UNITED STATES PATENT AND TRADEMARK OFFICE
CERTIFICATE OF CORRECTION

PATENT NO. : 10,979,427 B2  
APPLICATION NO. : 15/856049  
DATED : April 13, 2021  
INVENTOR(S) : Zhou Lu and Huazhang Yu Page 1 of 1

It is certified that error appears in the above-identified patent and that said Letters Patent is hereby corrected as shown below:

On the Title Page

Item (73) should read as follows:  
(73) Assignee: FEITIAN TECHNOLOGIES CO., LTD., Beijing (CN)

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*